(12) United States Patent
Huang et al.

(10) Patent No.: US 12,039,440 B2
(45) Date of Patent: Jul. 16, 2024

(54) IMAGE CLASSIFICATION METHOD AND APPARATUS, AND IMAGE CLASSIFICATION MODEL TRAINING METHOD AND APPARATUS

(71) Applicants: Huawei Technologies Co., Ltd., Shenzhen (CN); Peking University, Beijing (CN)

(72) Inventors: Weiran Huang, Beijing (CN); Aoxue Li, Beijing (CN); Zhenguo Li, Hong Kong (CN); Tiange Luo, Beijing (CN); Liwei Wang, Beijing (CN)

(73) Assignees: Huawei Technologies Co., Ltd., Shenzhen (CN); Peking University, Beijing (CN)

( * ) Notice: Subject to any disclaimer, the term of this patent is extended or adjusted under 35 U.S.C. 154(b) by 284 days.

(21) Appl. No.: 17/582,880

(22) Filed: Jan. 24, 2022

(65) Prior Publication Data
US 2022/0148291 A1 May 12, 2022

Related U.S. Application Data

(63) Continuation of application No. PCT/CN2020/102741, filed on Jul. 17, 2020.

(30) Foreign Application Priority Data
Jul. 24, 2019 (CN) .......................... 201910672533.7

(51) Int. Cl.
*G06V 10/774* (2022.01)
*G06N 3/045* (2023.01)
(Continued)

(52) U.S. Cl.
CPC .............. *G06N 3/08* (2013.01); *G06N 3/045* (2023.01); *G06V 10/774* (2022.01); *G06V 10/82* (2022.01)

(58) Field of Classification Search
CPC ......... G06N 3/08; G06N 3/045; G06V 10/774
See application file for complete search history.

(56) References Cited

U.S. PATENT DOCUMENTS

2019/0080453 A1  3/2019  Song et al.

FOREIGN PATENT DOCUMENTS

| CN | 102540164 A | 7/2012 |
|----|-------------|--------|
| CN | 109325532 A | 2/2019 |

(Continued)

OTHER PUBLICATIONS

Li et al., "Few-Shot Learning with Global Class Representations," Proceedings of the IEEE/CVF International Conference on Computer Vision (ICCV), pp. 9715-9724 (Feb. 2020).

(Continued)

*Primary Examiner* — Myron Wyche
(74) *Attorney, Agent, or Firm* — Leydig, Voit & Mayer, Ltd.

(57) ABSTRACT

An image classification method and apparatus, and an image classification model training method and apparatus are provided, which are related to an image recognition technology in the artificial intelligence field and more specifically, to the computer vision field. The method includes: obtaining a to-be-processed image; and classifying the to-be-processed image based on a preset global class feature, to obtain a classification result of the to-be-processed image. The preset global class feature includes a plurality of class features obtained through training based on a plurality of training images in a training set. The plurality of class features in the preset global class feature are used to indicate visual features of all classes in the training set.

30 Claims, 7 Drawing Sheets

(51) Int. Cl.
*G06N 3/08* (2023.01)
*G06V 10/82* (2022.01)

(56) References Cited

FOREIGN PATENT DOCUMENTS

| | | |
|---|---|---|
| CN | 109344869 A | 2/2019 |
| CN | 109919252 A | 6/2019 |
| CN | 109934261 A | 6/2019 |

OTHER PUBLICATIONS

Sung et al., "Learning to Compare: Relation Network for Few-Shot Learning," Proceedings of the IEEE Conference on Computer Vision and Pattern Recognition (CVPR), 2018 paper, total 10 pages (2018).

Snell et al., "Prototypical Networks for Few-shot Learning," 31st Conference on Neural Information Processing Systems (NIPS 2017), Long Beach, CA, USA, total 11 pages (2017).

Gidaris et al., "Dynamic Few-Shot Visual Learning without Forgetting," arXiv:1804.09458v1 [cs.CV], total 11 pages (Apr. 25, 2018).

Shi et al., "Relational Generalized Few-Shot Learning," arXiv: 1907.09557, Total 18 pages (Sep. 15, 2020).

IMAGE CLASSIFICATION METHOD AND APPARATUS, AND IMAGE CLASSIFICATION MODEL TRAINING METHOD AND APPARATUS

CROSS-REFERENCE TO RELATED APPLICATIONS

This application is a continuation of International Application No. PCT/CN2020/102741, filed on Jul. 17, 2020, which claims priority to Chinese Patent Application No. 201910672533.7, filed on Jul. 24, 2019. The disclosures of the aforementioned applications are hereby incorporated by reference in their entireties.

TECHNICAL FIELD

Embodiments of this application relate to the artificial intelligence field, and more specifically, to an image classification method and apparatus, and an image classification model training method and apparatus.

BACKGROUND

Computer vision is an inseparable part of various intelligent/autonomous systems in various application fields, for example, manufacturing, inspection, document analysis, medical diagnosis, and military. Computer vision is about how to use a camera/a video camera and a computer to obtain required data and information of a photographed object. Figuratively, computer vision equips the computer with an eye (the camera/video camera) and a brain (an algorithm) to recognize, track, and measure an object in place of human eyes, so that the computer can perceive an environment. Because perception may be considered as extracting information from a sensory signal, computer vision may also be considered as a science of studying how to enable an artificial system to perform "perception" on an image or multi-dimensional data. Generally, computer vision uses various imaging systems to obtain input information in place of a visual organ and then uses the computer to process and explain the input information in place of a brain. An ultimate research goal of computer vision is to enable the computer to observe and understand the world as human beings through a visual sense and have a capability of autonomously adapting to the environment.

Image (or picture) classification is a basis for various image processing applications. Computer vision often relates to how to classify an obtained image. With rapid development of machine learning (or deep learning), a machine learning algorithm is more widely applied in image classification processing. In addition, a very good effect is also obtained. However, the machine learning algorithm highly relies on a large amount of tagged training data. In many cases, it is very difficult to obtain data.

Therefore, how to better classify an image when training data is insufficient is an urgent problem to be resolved.

SUMMARY

This application provides an image classification method and apparatus, and an image classification model training method and apparatus, to better classify an image.

According to a first aspect, an image classification method is provided. The method includes: obtaining a to-be-processed image; and classifying the to-be-processed image based on a preset global class feature, to obtain a classification result of the to-be-processed image. The global class feature includes a plurality of class features obtained through training based on a plurality of training images in a training set. The plurality of class features in the global class feature are used to indicate visual features of all classes in the training set. All the classes in the training set are classes to which all the training images in the training set belong. The training set includes images in a base class and images in a novel class.

The base class may be understood as a large-scale training image set. The base class generally includes a large quantity of tagged images used for model training. The images in the base class may be tagged images. The tagged image herein may indicate an image tagged with a class to which the image belongs.

Correspondingly, in comparison with the base class, the novel class generally includes a small quantity of tagged samples. The images in the novel class may also be tagged images. In other words, in this embodiment of this application, the novel class is few-shot. The novel class includes a small quantity of images tagged with a class to which the images belong.

For example, the base class includes 100 classes, and each class includes 1000 training images. The novel class includes five classes, and each class includes five training images.

In this application, the global class feature is obtained through training based on the plurality of training images in the training set. The global class feature includes the plurality of class features that can indicate the visual features corresponding to all the classes in the training set. In addition, because the training set used in a global class training process includes the images in the base class and the images in the novel class, the global class feature can be avoided from being overfit to the images in the base class, to more accurately identify the images in the novel class.

Optionally, for an image classification model in this application, model training may be performed according to an episodic training policy. For example, a model training process may be divided into a plurality of training episodes. In each training episode, several classes in the training set may be randomly selected to train the model. Finally, the model training is completed after the plurality of training episodes.

Specifically, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to obtain a better image classification result.

With reference to the first aspect, in some implementations of the first aspect, the classifying the to-be-processed image based on a preset global class feature, to obtain a classification result of the to-be-processed image includes: extracting a feature vector of the to-be-processed image; determining, based on the feature vector of the to-be-processed image, confidence that the to-be-processed image belongs to a candidate class, where the candidate class is one or more of the plurality of classes indicated by the global class feature; and determining the classification result of the to-be-processed image from the candidate class based on the confidence.

With reference to the first aspect, in some implementations of the first aspect, before the determining, based on the feature vector of the to-be-processed image, confidence that the to-be-processed image belongs to a candidate class, the method further includes: determining a local class feature of the to-be-processed image based on a support set of the to-be-processed image; and determining the candidate class based on the local class feature of the to-be-processed image and the global class feature. The support set of the to-be-processed image includes a plurality of images. A class to which the plurality of images belong is one or more of the plurality of classes indicated by the global class feature.

With reference to the first aspect, in some implementations of the first aspect, the determining, based on the feature vector of the to-be-processed image, confidence that the to-be-processed image belongs to a candidate class includes: determining, based on the feature vector of the to-be-processed image, a distance between the feature vector of the to-be-processed image and a feature vector corresponding to each class in the candidate class; and determining, based on the distance, the confidence that the to-be-processed image belongs to the candidate class.

With reference to the first aspect, in some implementations of the first aspect, the determining the classification result of the to-be-processed image from the candidate class based on the confidence includes: determining a class with largest confidence in the candidate class as the classification result of the to-be-processed image.

With reference to the first aspect, in some implementations of the first aspect, the global class feature is obtained through training based on a classification error, the classification error is determined based on a classification result of a training image in a query set and a pre-tagged label of the training image in the query set, the label is used to indicate a class to which the training image belongs, and the query set includes some training images in some classes in the training set.

In this application, the classification error is determined based on the classification result of the training image in the query set and the pre-tagged label of the training image. The training image in the query set includes an image in the base class and an image in the novel class. The global class feature is updated based on the classification error. In this way, the global class feature can be avoided from being overfit to the images in the base class, to more accurately identify the images in the novel class.

Further, the global class feature may be updated by using classification errors in a current training episode in the plurality of training episodes in the model training process. In addition, the training set includes the images in the base class and the images in the novel class. An effect generated in the training process of the novel class may accumulate with the global class feature. Therefore, the trained image classification model can be avoided from being overfit to the base class. The to-be-processed image is classified based on the image classification model, to obtain a better image classification result.

With reference to the first aspect, in some implementations of the first aspect, the global class feature is obtained through training based on a classification error and a registration error, the classification error is determined based on a classification result of a training image in a query set and a pre-tagged label of the training image in the query set, the label is used to indicate a class to which the training image belongs, the query set includes some training images in some classes in the training set, the registration error is determined based on a local class feature of training images and the plurality of class features in the global class feature, the local class feature of the training images includes a plurality of class features determined based on the plurality of training images in the support set, the plurality of class features in the local class feature of the training images are used to indicate visual features of all classes in the support set, and the support set includes some training images in some classes in the training set.

In this application, the classification error is determined based on the classification result of the training image in the query set and the pre-tagged label of the training image. The training image in the query set includes an image in the base class and an image in the novel class. The registration error is determined based on the local class feature of the training images and the plurality of class features in the global class feature. The local class feature of the training images includes a plurality of class features determined based on the plurality of training images in the support set. The global class feature is updated based on the classification error and the registration error. In this way, the global class feature can be avoided from being overfit to the images in the base class, to more accurately identify the images in the novel class.

Further, the global class feature may be updated by using classification errors and a registration error in a current training episode in the plurality of training episodes in the model training process. In addition, the training set includes the images in the base class and the images in the novel class. An effect generated in the training process of the novel class may accumulate with the global class feature. Therefore, the trained image classification model can be avoided from being overfit to the base class. The to-be-processed image is classified based on the image classification model, to obtain a better image classification result.

With reference to the first aspect, in some implementations of the first aspect, the local class feature of the training images is determined based on the plurality of training images that are obtained after expansion processing is performed on the support set, and the expansion processing includes cropping processing, flipping processing, and/or data hallucination processing on an image.

The plurality of training images in the support set are the images in the novel class.

In this application, expansion processing is performed on the plurality of training images in the novel class through cropping processing, flipping processing, and/or data hallucination processing, to increase a quantity of training images in the novel class. Therefore, the trained image classification model can be avoided from being overfit to the base class. The to-be-processed image is classified based on the image classification model, to obtain a better image classification result.

According to a second aspect, an image classification model training method is provided. The method includes: obtaining a plurality of training images in a training set, where the training set includes a support set and a training set, and the plurality of training images include a plurality of training images in the support set and a plurality of training images in a query set; extracting feature vectors of the plurality of training images in the query set based on a preset first neural network, where the query set includes some images in some classes in the training set; processing the feature vectors of the plurality of training images in the query set based on a preset second neural network and a preset global class feature, to obtain classification results of the plurality of training images in the query set, where the global class feature includes a plurality of class features, the plurality of class features in the global class feature are used to indicate visual features of all classes in the training set, all the classes in the training set are classes to which all the training images in the training set belong, and the training set includes images in a base class and images in a novel class; and updating the global class feature based on the classification results of the plurality of training images in the query set.

The base class may be understood as a large-scale training image set. The base class generally includes a large quantity of tagged images used for model training. The images in the base class may be tagged images. The tagged image herein may indicate an image tagged with a class to which the image belongs.

Correspondingly, in comparison with the base class, the novel class generally includes a small quantity of tagged samples. The images in the novel class may also be tagged images. In other words, in this embodiment of this application, the novel class is few-shot. The novel class includes a small quantity of images tagged with a class to which the images belong.

For example, the base class includes 100 classes, and each class includes 1000 training images. The novel class includes five classes, and each class includes five training images.

In this application, the global class feature is obtained through training based on the classification results of the training images in the training set. The global class feature includes the plurality of class features that can indicate the visual features corresponding to all the classes in the training set. In addition, because the training set used in a global class training process includes the images in the base class and the images in the novel class, the global class feature can be avoided from being overfit to the images in the base class, to more accurately identify the images in the novel class.

Optionally, for the image classification model training method in this application, model training may be performed according to an episodic training policy. For example, a model training process may be divided into a plurality of training episodes. In each training episode, several classes in the training set may be randomly selected to train the model. Finally, the model training is completed after the plurality of training episodes.

Specifically, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to obtain a better image classification result.

Optionally, feature vectors of the plurality of training images in the support set and the feature vectors of the plurality of training images in the query set may be extracted.

With reference to the second aspect, in some implementations of the second aspect, the processing the feature vectors of the plurality of training images in the query set based on a preset second neural network and a preset global class feature, to obtain classification results of the plurality of training images in the query set includes: extracting feature vectors of the plurality of training images in the support set, where the support set includes some training images in some classes in the training set; determining a local class feature of the training images based on the feature vectors of the plurality of training images in the support set, where a plurality of class features in the local class feature of the training images are used to indicate visual features of all classes in the support set, and the support set includes some training images in some classes in the training set; and determining the classification results of the plurality of training images in the query set based on the second neural network, the local class feature of the training images, and the global class feature.

With reference to the second aspect, in some implementations of the second aspect, the updating the global class feature based on the classification results of the plurality of training images in the query set includes: updating the global class feature, the first neural network, and the second neural network based on the classification results of the plurality of training images in the query set.

With reference to the second aspect, in some implementations of the second aspect, the updating the global class feature based on the classification results of the plurality of training images in the query set includes: updating the global class feature based on classification errors, where the classification errors are determined based on the classification results of the plurality of training images in the query set and pre-tagged labels of the plurality of training images in the query set, and the label is used to indicate a class to which the training image belongs.

In this application, the classification error is determined based on the classification result of the training image in the query set and the pre-tagged label of the training image. The training image in the query set includes an image in the base class and an image in the novel class. The global class feature is updated based on the classification errors. In this way, the global class feature can be avoided from being overfit to the images in the base class, to more accurately identify the image in the novel class.

Further, the global class feature may be updated by using classification errors in a current training episode in the plurality of training episodes in the model training process. In addition, the training set includes the images in the base class and the images in the novel class. An effect generated in the training process of the novel class may accumulate with the global class feature. Therefore, the trained image classification model can be avoided from being overfit to the base class. The to-be-processed image is classified based on the image classification model, to obtain a better image classification result.

With reference to the second aspect, in some implementations of the second aspect, the updating the global class feature based on the classification results of the plurality of training images includes: updating the global class feature based on the classification errors and a registration error, where the registration error is determined based on the local class feature of the training images and the plurality of class features in the global class feature.

In this application, the classification error is determined based on the classification result of the training image in the query set and the pre-tagged label of the training image. The training image in the query set includes an image in the base class and an image in the novel class. The registration error is determined based on the local class feature of the training images and the plurality of class features in the global class feature. The local class feature of the training images includes a plurality of class features determined based on the plurality of training images in the support set. The global class feature is updated based on the classification errors and the registration error. In this way, the global class feature can be avoided from being overfit to the images in the base class, to more accurately identify the images in the novel class.

Further, the global class feature may be updated by using classification errors and a registration error in a current training episode in the plurality of training episodes in the model training process. In addition, the training set includes the images in the base class and the images in the novel class. An effect generated in the training process of the novel class may accumulate with the global class feature. Therefore, the trained image classification model can be avoided from being overfit to the base class. The to-be-processed image is classified based on the image classification model, to obtain a better image classification result.

With reference to the second aspect, in some implementations of the second aspect, the local class feature of the training images is determined based on the plurality of training images that are obtained after expansion processing is performed on the support set, and the expansion processing includes cropping processing, flipping processing, and/or data hallucination processing on an image.

The plurality of training images in the support set are the images in the novel class.

In this application, expansion processing is performed on the plurality of training images in the novel class through cropping processing, flipping processing, and/or data hallucination processing, to increase a quantity of training images in the novel class. Therefore, the trained image classification model can be avoided from being overfit to the base class. The to-be-processed image is classified based on the image classification model, to obtain a better image classification result.

According to a third aspect, an image classification apparatus is provided. The apparatus includes: an obtaining module, configured to obtain a to-be-processed image; and a classification module, configured to classify the to-be-processed image based on a preset global class feature, to obtain a classification result of the to-be-processed image. The global class feature includes a plurality of class features obtained through training based on a plurality of training images in a training set. The plurality of class features in the global class feature are used to indicate visual features of all classes in the training set. All the classes in the training set are classes to which all the training images in the training set belong. The training set includes images in a base class and images in a novel class.

In this embodiment of this application, for the image classification apparatus, the global class feature is obtained through training based on the plurality of training images in the training set. The global class feature includes the plurality of class features that can indicate the visual features corresponding to all the classes in the training set. In addition, because the training set used in a global class training process includes the images in the base class and the images in the novel class, the global class feature can be avoided from being overfit to the images in the base class, to more accurately identify the images in the novel class.

Specifically, for the global classification apparatus, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification apparatus can be avoided from being overfit to the base class. The to-be-processed image is classified based on the image classification apparatus, to obtain a better image classification result.

With reference to the third aspect, in some implementations of the third aspect, the classification module is specifically configured to: extract a feature vector of the to-be-processed image; determine, based on the feature vector of the to-be-processed image, confidence that the to-be-processed image belongs to a candidate class, where the candidate class is one or more of the plurality of classes indicated by the global class feature; and determine the classification result of the to-be-processed image from the candidate class based on the confidence.

With reference to the third aspect, in some implementations of the third aspect, the apparatus further includes a determining module, configured to: determine a local class feature of the to-be-processed image based on a support set of the to-be-processed image; and determine the candidate class based on the local class feature of the to-be-processed image and the global class feature. The support set of the to-be-processed image includes a plurality of images. A class to which the plurality of images belong is one or more of the plurality of classes indicated by the global class feature.

With reference to the third aspect, in some implementations of the third aspect, the classification module is specifically configured to: determine, based on the feature vector of the to-be-processed image, a distance between the feature vector of the to-be-processed image and a feature vector corresponding to each class in the candidate class; and determine, based on the distance, the confidence that the to-be-processed image belongs to the candidate class.

With reference to the third aspect, in some implementations of the third aspect, the classification module is specifically configured to: determine a class with largest confidence in the candidate class as the classification result of the to-be-processed image.

With reference to the third aspect, in some implementations of the third aspect, the global class feature is obtained through training based on a classification error, the classification error is determined based on a classification result of a training image in a query set and a pre-tagged label of the training image in the query set, the label is used to indicate a class to which the training image belongs, and the query set includes some training images in some classes in the training set.

In this application, the classification error is determined based on the classification result of the training image in the query set and the pre-tagged label of the training image. The training image in the query set includes an image in the base class and an image in the novel class. The global class feature is updated based on the classification error. In this way, the global class feature can be avoided from being overfit to the images in the base class, to more accurately identify the images in the novel class.

With reference to the third aspect, in some implementations of the third aspect, the global class feature is obtained through training based on a classification error and a registration error, the classification error is determined based on a classification result of a training image in a query set and a pre-tagged label of the training image in the query set, the label is used to indicate a class to which the training image belongs, the query set includes some training images in some classes in the training set, the registration error is determined based on a local class feature of training images and the plurality of class features in the global class feature, the local class feature of the training images includes a plurality of class features determined based on the plurality of training images in the support set, the plurality of class features in the local class feature of the training images are used to indicate visual features of all classes in the support set, and the support set includes some training images in some classes in the training set.

In this application, the classification error is determined based on the classification result of the training image in the query set and the pre-tagged label of the training image. The training image in the query set includes an image in the base class and an image in the novel class. The registration error is determined based on the local class feature of the training images and the plurality of class features in the global class feature. The local class feature of the training images includes a plurality of class features determined based on the plurality of training images in the support set. The global class feature is updated based on the classification error and the registration error. In this way, the global class feature can be avoided from being overfit to the images in the base class, to more accurately identify the images in the novel class.

With reference to the third aspect, in some implementations of the third aspect, the local class feature of the training images is determined based on the plurality of training images that are obtained after expansion processing is performed on the support set, and the expansion processing includes cropping processing, flipping processing, and/or data hallucination processing on an image.

The plurality of training images in the support set are the images in the novel class.

In this application, expansion processing is performed on the plurality of training images in the novel class through cropping processing, flipping processing, and/or data hallucination processing, to increase a quantity of training images in the novel class. Therefore, the trained image classification apparatus can be avoided from being overfit to the base class. The to-be-processed image is classified based on the image classification apparatus, to obtain a better image classification result.

According to a fourth aspect, an image classification model training apparatus is provided. The apparatus includes: an obtaining module, configured to obtain a plurality of training images in a training set, where the training set includes a support set and a training set, and the plurality of training images include a plurality of training images in the support set and a plurality of training images in a query set; a feature extraction module, configured to extract feature vectors of the plurality of training images in the query set based on a preset first neural network, where the query set includes some images in some classes in the training set; a classification module, configured to process the feature vectors of the plurality of training images in the query set based on a preset second neural network and a preset global class feature, to obtain classification results of the plurality of training images in the query set, where the global class feature includes a plurality of class features, the plurality of class features in the global class feature are used to indicate visual features of all classes in the training set, all the classes in the training set are classes to which all the training images in the training set belong, and the training set includes images in a base class and images in a novel class; and an update module, configured to update the global class feature based on the classification results of the plurality of training images in the query set.

In this application, the global class feature is obtained through training based on the classification results of the plurality of training images in the training set. The global class feature includes the plurality of class features that can indicate the visual features corresponding to all the classes in the training set. In addition, because the training set used in a global class training process includes the images in the base class and the images in the novel class, the global class feature can be avoided from being overfit to the images in the base class, to more accurately identify the images in the novel class.

Specifically, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to obtain a better image classification result.

With reference to the fourth aspect, in some implementations of the fourth aspect, the classification module is specifically configured to: extract feature vectors of the plurality of training images in the support set, where the support set includes some training images in some classes in the training set; determine a local class feature of the training images based on the feature vectors of the plurality of training images in the support set, where a plurality of class features in the local class feature of the training images are used to indicate visual features of all classes in the support set, and the support set includes some training images in some classes in the training set; and determine the classification results of the plurality of training images in the query set based on the second neural network, the local class feature of the training images, and the global class feature.

With reference to the fourth aspect, in some implementations of the fourth aspect, the update module is specifically configured to update the global class feature, the first neural network, and the second neural network based on the classification results of the plurality of training images in the query set.

With reference to the fourth aspect, in some implementations of the fourth aspect, the update module is specifically configured to update the global class feature based on classification errors, where the classification errors are determined based on the classification results of the plurality of training images in the query set and pre-tagged labels of the plurality of training images in the query set, and the label is used to indicate a class to which the training image belongs.

In this application, the classification error is determined based on the classification result of the training image in the query set and the pre-tagged label of the training image. The training image in the query set includes an image in the base class and an image in the novel class. The global class feature is updated based on the classification errors. In this way, the global class feature can be avoided from being overfit to the images in the base class, to more accurately identify the images in the novel class.

With reference to the fourth aspect, in some implementations of the fourth aspect, the update module is specifically configured to update the global class feature based on the classification errors and a registration error, where the registration error is determined based on the local class feature of the training images and the plurality of class features in the global class feature.

In this application, the classification error is determined based on the classification result of the training image in the query set and the pre-tagged label of the training image. The training image in the query set includes an image in the base class and an image in the novel class. The registration error is determined based on the local class feature of the training images and the plurality of class features in the global class feature. The local class feature of the training images includes a plurality of class features determined based on the plurality of training images in the support set. The global class feature is updated based on the classification errors and the registration error. In this way, the global class feature can be avoided from being overfit to the images in the base class, to more accurately identify the images in the novel class.

With reference to the fourth aspect, in some implementations of the fourth aspect, the local class feature of the training images is determined based on the plurality of training images that are obtained after expansion processing is performed on the support set, and the expansion processing includes cropping processing, flipping processing, and/or data hallucination processing on an image.

The plurality of training images in the support set are the images in the novel class.

In this application, expansion processing is performed on the plurality of training images in the novel class through cropping processing, flipping processing, and/or data hallucination processing, to increase a quantity of training images in the novel class. Therefore, the trained image classification model can be avoided from being overfit to the base class. The to-be-processed image is classified based on the image classification model, to obtain a better image classification result.

According to a fifth aspect, an image classification apparatus is provided. The apparatus includes: a memory, configured to store a program; and a processor, configured to execute the program stored in the memory. When the program stored in the memory is executed, the processor is configured to perform the method according to any one of the implementations of the first aspect.

According to a sixth aspect, an image classification model training apparatus is provided. The apparatus includes: a memory, configured to store a program; and a processor, configured to execute the program stored in the memory. When the program stored in the memory is executed, the processor is configured to perform the method according to any one of the implementations of the second aspect.

The processor in the fifth aspect and the sixth aspect may be a central processing unit (CPU), or a combination of a CPU and a neural network computing processor. The neural network computing processor herein may include a graphics processing unit (GPU), a neural network processing unit (NPU), a tensor processing unit (TPU), and the like. The TPU is a dedicated integrated circuit of an artificial intelligence accelerator customized for machine learning by Google.

According to a seventh aspect, a computer-readable medium is provided. The computer-readable medium stores program code to be executed by a device. The program code is used to perform the method according to any one of the implementations of the first aspect or the second aspect.

According to an eighth aspect, a computer program product including instructions is provided. When the computer program product runs on a computer, the computer is enabled to perform the method according to any one of the implementations of the first aspect or the second aspect.

According to a ninth aspect, a chip is provided. The chip includes a processor and a data interface. The processor uses the data interface to read instructions stored in a memory, to perform the method according to any one of the implementations of the first aspect or the second aspect.

Optionally, in an implementation, the chip may further include the memory. The memory stores the instructions. The processor is configured to execute the instructions stored in the memory. When the instructions are executed, the processor is configured to perform the method according to any one of the implementations of the first aspect or the second aspect.

The chip may be specifically a field-programmable gate array (FPGA) or an application-specific integrated circuit (ASIC).

According to a tenth aspect, an electronic device is provided. The electronic device includes the image classification apparatus in any aspect of the third aspect, or the electronic device includes the image classification model training apparatus in any aspect of the fourth aspect.

When the electronic device includes the image classification apparatus in any aspect of the third aspect, the electronic device may be specifically a terminal device.

When the electronic device includes the image classification model training apparatus in any aspect of the fourth aspect, the electronic device may be specifically a server.

In this application, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to more accurately identify the images in the novel class.

DESCRIPTION OF EMBODIMENTS

Figure 1:
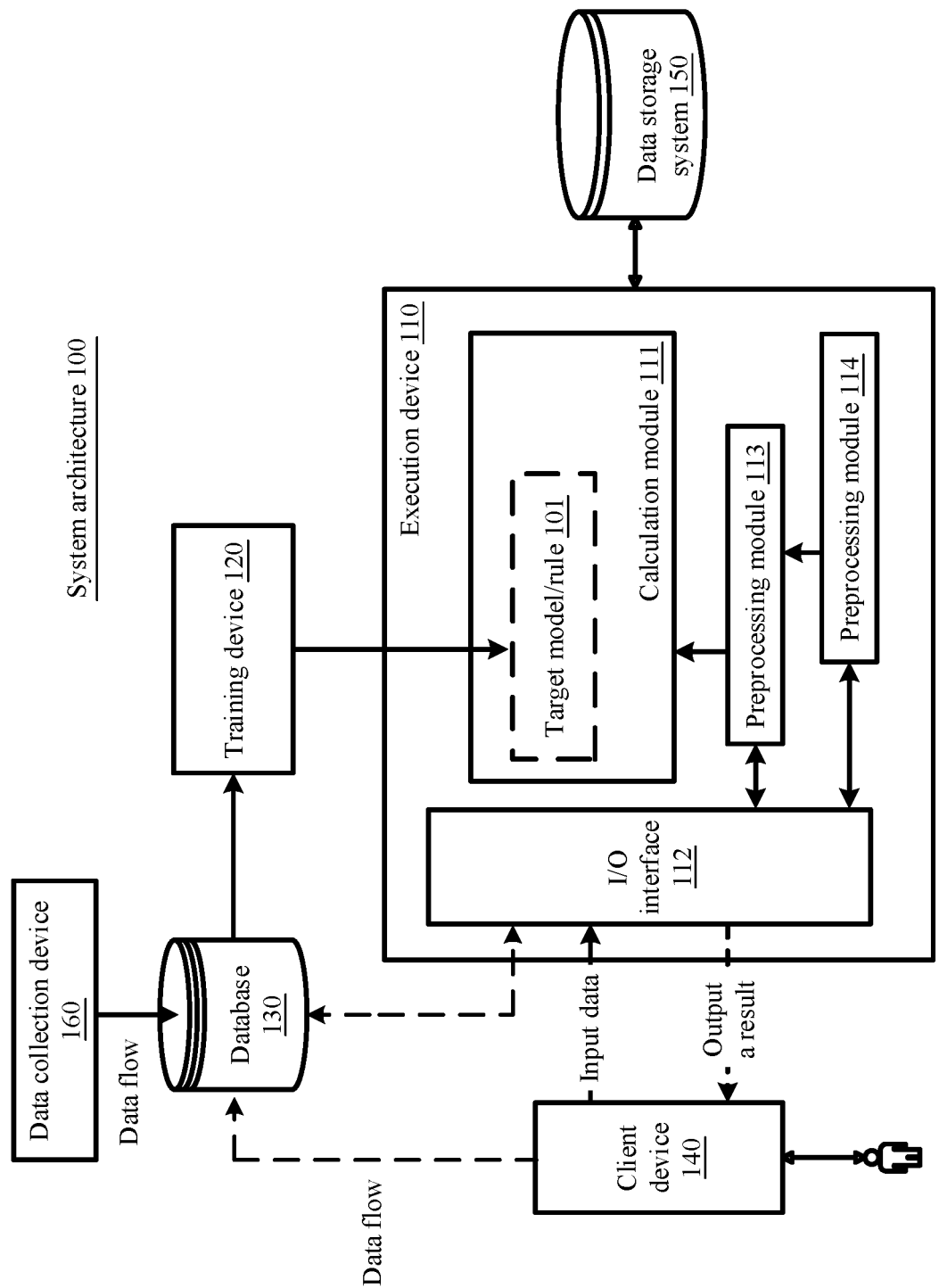
FIG. 1 is a schematic diagram of a structure of a system architecture according to an embodiment of this application.

The following describes technical solutions of this application with reference to the accompanying drawings.

An image classification method provided in the embodiments of this application can be applied to scenarios such as picture retrieval, album management, Safe City, human-computer interaction, and another scenario in which image classification or image recognition is required. It should be understood that an image in the embodiments of this application may be a static image (or referred to as a static picture) or a moving image (or referred to as a moving picture). For example, the image in this application may be a video or a moving picture, or the image in this application may be a static picture or photo. For ease of description, the static image or the moving image is collectively referred to as an image in the following embodiments of this application.

Specifically, the image classification method in the embodiments of this application may be specifically applied to an album classification scenario and a photographing recognition scenario. The following describes the two scenarios in detail.

Album Classification:

A user stores a large quantity of pictures on a mobile phone and a cloud disk. User experience can be improved by performing classification management on an album based on a category. An album arranged or stored based on a category can be obtained by classifying a picture in the album by using the image classification method in the embodiments of this application. The picture classification method in the embodiments of this application can be used to facilitate classification management on different categories of objects by the user, thereby facilitating user searching, reducing management time of the user, and improving album management efficiency.

Specifically, when the image classification method in the embodiments of this application is used to implement album classification, a picture feature of a picture in the album may be first extracted; then, the picture in the album may be classified based on the extracted picture feature to obtain a picture classification result; and afterwards, the picture in the album may be further classified based on the picture classification result to obtain an album arranged based on a picture category. When the pictures in the album are arranged based on the picture category, pictures belonging to a same category may be arranged in one row or one row. For example, in the finally obtained album, pictures in a first row are about an airplane, and pictures in a second row are about a vehicle.

Object recognition through photographing:

During photographing, a user may process a taken photo by using the image classification method in the embodiments of this application, to automatically recognize a category of a photographed object. For example, the photographed object may be automatically recognized as a flower, an animal, or the like. Further, the image classification method in the embodiments of this application may be used to recognize the photographed object, to recognize the category to which the object belongs. For example, a photo taken by the user includes a shared bicycle. The image classification method in the embodiments of this application may be used to recognize the shared bicycle, to recognize that the object belongs to a bicycle. Further, information related to the bicycle may be further displayed.

Because the present invention has an excellent effect for generalized few-shot learning, recognition can be well implemented regardless of whether the photographed object is in a base class or a novel class.

In a conventional technology, for an image class with few training samples, image classification or image recognition usually cannot be effectively performed on an image belonging to the image class. In the image classification method in the embodiments of this application, image classification or image recognition can also be well implemented for the novel class with few training samples (few-shot).

It should be understood that the album classification and the object recognition through photographing described above are merely two specific scenarios to which the image classification method in the embodiments of this application is applied. The image classification method in the embodiments of this application is not limited to the foregoing two scenarios during application. The image classification method in the embodiments of this application can be applied to any scenario requiring image classification or image recognition.

The embodiments of this application relate to a large quantity of applications related to a neural network. To better understand the solutions in the embodiments of this application, the following first describes related terms and other related concepts of the neural network that may be involved in the embodiments of this application.

(1) Neural Network

The neural network may include neurons. The neuron may indicate an operation unit that uses $x_s$ and an intercept 1 as input. Output of the operation unit may be shown in Formula (1-1):

$$h_{W,b}(x) = f(W^T x) = f\left(\sum_{s=1}^{n} W_s x_s + b\right) \qquad (1\text{-}1)$$

Herein, s=1, 2, . . . , and n, n is a natural number greater than 1, $W_s$ is a weight of $x_s$, b is a bias of a neuron, and f is an activation function of the neuron, and is used to introduce a nonlinear feature into the neural network, to convert an input signal in the neuron into an output signal. The output signal of the activation function may be used as input of a next convolutional layer. The activation function may be a sigmoid function. The neural network is a network formed by connecting a plurality of single neurons together. In other words, output of one neuron may be input of another neuron. Input of each neuron may be connected to a local acceptance field of a previous layer, to extract a feature of the local acceptance field. The local acceptance field may be an area including several neurons.

(2) Deep Neural Network

The deep neural network (DNN), also referred to as a multi-layer neural network, may be understood as a neural network including a plurality of hidden layers. The DNN is divided according to locations of different layers. The neural network of the DNN may be divided into three types of layers: an input layer, a hidden layer, and an output layer. Generally, a first layer is the input layer, the last layer is the output layer, and a middle layer is the hidden layer. The layers are fully connected to each other. In other words, any neuron at an $i^{th}$ layer needs to be connected to any neuron at an $(i+1)^{th}$ layer.

Although the DNN appears to be very complex, the network is not complex in terms of working at each layer. This is simply as the following linear relational expression: $\vec{y} = \alpha(W \cdot \vec{x} + \vec{b})$. Herein, $\vec{x}$ is an input vector, $\vec{y}$ is an output vector, $\vec{b}$ is a bias vector, W is a weight matrix (also referred to as a coefficient), and $\alpha(\ )$ is an activation function. At each layer, only a simple operation is performed on the input vector $\vec{x}$ to obtain the output vector $\vec{y}$. Because the DNN has a plurality of layers, there are also a large quantity of coefficients W and bias vectors $\vec{b}$. Definitions of these parameters in the DNN are as follows: The coefficient W is used as an example. It is assumed that the DNN includes three layers. In this case, a linear coefficient from a fourth neuron at a second layer to a second neuron at a third layer is defined as $W_{24}^3$. The superscript 3 represents a number of a layer at which the coefficient is located, and the subscript corresponds to an index 2 at the output third layer and an index: 4 at the input second layer.

In conclusion, a coefficient from a $k^{th}$ neuron at an $(L-1)^{th}$ layer to a $j^{th}$ neuron at an $L^{th}$ layer is defined as $W_{jk}^L$.

It should be noted that the input layer does not have the parameter W. In the deep neural network, more hidden layers allow the network to better characterize complex situations in the real world. In theory, more parameters in a model indicate higher complexity and a larger "capacity". This indicates that the model can complete a more complex learning task. A process of training the deep neural network is a process of learning a weight matrix. A final purpose of this process is to obtain a weight matrix of all layers of the trained deep neural network (a weight matrix formed by vectors W of the layers).

(3) Convolutional Neural Network

The convolutional neural network (CNN) is a deep neural network with a convolutional structure. The convolutional neural network includes a feature extractor including a convolutional layer and a sampling sublayer. The feature extractor may be considered as a filter. The convolutional layer is a neuron layer in the convolutional neural network at which convolution processing is performed on an input signal. In the convolutional layer of the convolutional neural network, one neuron may be connected only to some neurons at a neighboring layer. One convolutional layer usually includes several feature planes. Each feature plane may include some neurons arranged in a rectangle form. Neurons in the same feature plane share a weight. The shared weight herein is a convolution kernel. The shared weight may be understood as follows: A manner of extracting image information is independent of a location. The convolution kernel may be initialized in a form of a matrix with a random size. In a process of training the convolutional neural network, a proper weight may be obtained through learning for the convolution kernel. In addition, sharing a weight reduces connections between the layers of the convolutional neural network and also reduces a risk of overfitting.

(4) Loss Function

In a process of training the deep neural network, because it is expected that output of the deep neural network is approximate a really desired prediction value as much as possible, a prediction value of a current network may be compared with a really desired target value, and a weight vector of each layer of the neural network may be updated based on a difference between the two values (certainly, there is usually an initiation process before a first time of update, that is, a parameter is preconfigured for each layer in the deep neural network). For example, if the prediction value of the network is high, the weight vector is adjusted to obtain a lower prediction value, and is continuously adjusted until the deep neural network can predict the really desired target value or predict a value very approximate the really desired target value. Therefore, "how to compare the prediction value and the target value" needs to be predefined. This is a loss function or an objective function. The functions are important equations used to measure the difference between the prediction value and the target value. The loss function is used as an example. A greater output value (loss) of the loss function indicates a larger difference. In this case, training the deep neural network becomes a process of narrowing the loss as much as possible.

(5) Back Propagation Algorithm

An error back propagation (BP) algorithm may be used in the neural network to correct a value of a parameter in an initial neural network model in a training process, to reduce a reconstruction error loss of the neural network model. Specifically, an error loss is generated when forward transmission is performed on an input signal until output is obtained. In this case, back propagation is performed on error loss information to update the parameter in the initial neural network model, so that the error loss is converged. The back propagation algorithm is a back propagation motion dominated by an error loss, and is intended to obtain a parameter of an optimal neural network model, for example, a weight matrix.

(6) Pixel Value

A pixel value of an image may be a red green blue (RGB) color value. The pixel value may be a long integer representing a color. For example, the pixel value is 256*Red+100*Green+76*Blue. Herein, Blue represents a blue component, Green represents a green component, and Red represents a red component. In these color components, a smaller value indicates lower brightness, and a larger value indicates higher brightness. For a grayscale image, the pixel value may be a grayscale value.

(7) Base Class

In the conventional technology, the base class includes a large quantity of labeled samples used for model training. A quantity of labeled samples meets a requirement for the model training. For example, the base class may include a plurality of images labeled with a class to which the images belong. The plurality of images may belong to one class, or the plurality of images may belong to a plurality of different classes. The base class may be used to train the image classification model in the embodiments of this application.

(8) Novel Class

In the conventional technology, the novel class is a concept relative to the base class. For example, if a model is trained by using a plurality of tagged samples, for the (trained) model, the plurality of tagged samples used during the training are the base class. A class not included in the base class is the novel class. For example, the model is trained by using a large quantity of images of animals (except dogs). In this case, if the model needs to recognize a dog, the large quantity of images of animals are the base class, and an image of the dog is the novel class.

Generally, each class in the novel class includes only a small quantity of tagged samples. In this application, the novel class may indicate few-shot (few-shot). In other words, the novel class includes few images tagged with a class to which the images belong. The plurality of images may belong to one class, or these images may belong to a plurality of different classes.

(9) Few-Shot Learning

The few-shot learning (FSL) is to train the image classification model by using a large-scale training set (including one or more base classes), and then for the novel class that has never been seen before (the novel class does not overlap the base class), accurately recognize a test sample (a class to which the sample belongs) in the novel class by using few training samples included in each novel class.

Further, the few-shot learning may include standard few-shot learning and generalized few-shot learning. For example, if the test sample in the few-shot learning includes only the novel class, this problem may be referred to as standard few-shot learning. If the test sample includes not only the novel class but also the base class, this problem may be referred to as generalized few-shot learning.

The image classification method in the embodiments of this application may be applied to both standard few-shot learning and generalized few-shot learning. With reference to FIG. 1, the following describes a system architecture to which an embodiment of this application is applicable.

As shown in FIG. 1, an embodiment of this application provides a system architecture 100. In FIG. 1, a data collection device 160 is configured to collect training data. For the image classification method in the embodiments of this application, the training data may include a training image and a classification result corresponding to the training image. The classification result of the training image may be a manually pre-tagged result.

After collecting the training data, the data collection device 160 stores the training data in a database 130. A training device 120 obtains a target model/rule 101 through training based on the training data maintained in the database 130.

The following describes a process in which the training device 120 obtains the target model/rule 101 based on the training data. The training device 120 processes an input original image, and compares an output image with the original image until a difference between the image output by the training device 120 and the original image is less than a specific threshold, to complete training of the target model/rule 101.

The target model/rule 101 can be used to implement the image classification method in the embodiments of this application. In other words, after related preprocessing, a to-be-processed image is input to the target model/rule 101, to obtain a classification result of the image. The target model/rule 101 in this embodiment of this application may be specifically the image classification model in the embodiments of this application. It should be noted that in actual application, the training data maintained in the database 130 is not necessarily all collected by the data collection device 160, and some training data may be received from another device. In addition, it should be noted that the training device 120 may not train the target model/rule 101 entirely based on the training data maintained in the database 130, and may train a model based on training data obtained from a cloud or another place. The foregoing description should not be construed as a limitation on this embodiment of this application.

The target model/rule 101 obtained through training by the training device 120 may be applied to different systems or devices, for example, applied to an execution device 110 shown in FIG. 1. The execution device 110 may be a terminal, for example, a mobile phone terminal, a tablet computer, a notebook computer, augmented reality (AR)/virtual reality (VR), or an in-vehicle terminal; or may be a server, a cloud device, or the like. In FIG. 1, the execution device 110 is configured with an input/output (I/O) interface 112, and is configured to exchange data with an external device. A user may input data to the I/O interface 112 by using a client device 140. The input data in this embodiment of this application may include a to-be-processed image input by using the client device.

A preprocessing module 113 and a preprocessing module 114 are configured to preprocess the input data (for example, the to-be-processed image) received by the I/O interface 112. In this embodiment of this application, there may alternatively be no preprocessing module 113 and no preprocessing module 114 (or there may be only one preprocessing module), and a calculation module 111 is directly used to process the input data.

In a process in which the execution device 110 preprocesses the input data, or in a process in which the calculation module 111 of the execution device 110 performs calculation or the like, the execution device 110 may invoke data, code, and the like in a data storage system 150 for corresponding processing; and may also store, in the data storage system 150, data, instructions, and the like that are obtained through the corresponding processing.

Finally, the I/O interface 112 returns a processing result such as the foregoing obtained classification result of the to-be-processed image to the client device 140, to provide the processing result for the user.

It should be noted that the training device 120 may generate, based on different training data, corresponding target models/rules 101 for different objectives or different tasks. The corresponding target models/rules 101 may be used to implement the foregoing objectives or complete the foregoing tasks, to provide a desired result for the user.

In the case shown in FIG. 1, the user may manually specify input data, and the input data may be manually specified by using an interface provided by the I/O interface 112. In another case, the client device 140 may automatically send the input data to the I/O interface 112. If it is required that the client device 140 needs to obtain a grant from the user for automatically sending the input data, the user may set corresponding permission in the client device 140. The user may view, on the client device 140, a result output by the execution device 110. A specific presentation form may be a specific manner such as displaying, sound, or an action. The client device 140 may also serve as a data collection end; collect, as new sample data, the input data that is input to the I/O interface 112 and an output result that is output from the I/O interface 112 shown in the figure; and store the new sample data in the database 130. Certainly, alternatively, the input data that is input to the I/O interface 112 and the output result that is output from the I/O interface 112 shown in the figure may be directly stored in the database 130 as the new sample data by the I/O interface 112, without being collected by the client device 140.

It should be noted that FIG. 1 is merely a schematic diagram of a system architecture according to an embodiment of this application. A location relationship between a device, a component, a module, and the like shown in the figure does not constitute any limitation. For example, in FIG. 1, the data storage system 150 is an external memory relative to the execution device 110, but in another case, the data storage system 150 may be disposed in the execution device 110.

As shown in FIG. 1, the target model/rule 101 is obtained through training by the training device 120. The target model/rule 101 in this embodiment of this application may be the image classification model in this application. Specifically, the image classification model provided in this embodiment of this application may include one or more neural networks. The one or more neural networks may include a CNN, a deep convolutional neural network (DCNN), and/or a recurrent neural network (RNNS), and the like.

Figure 2:
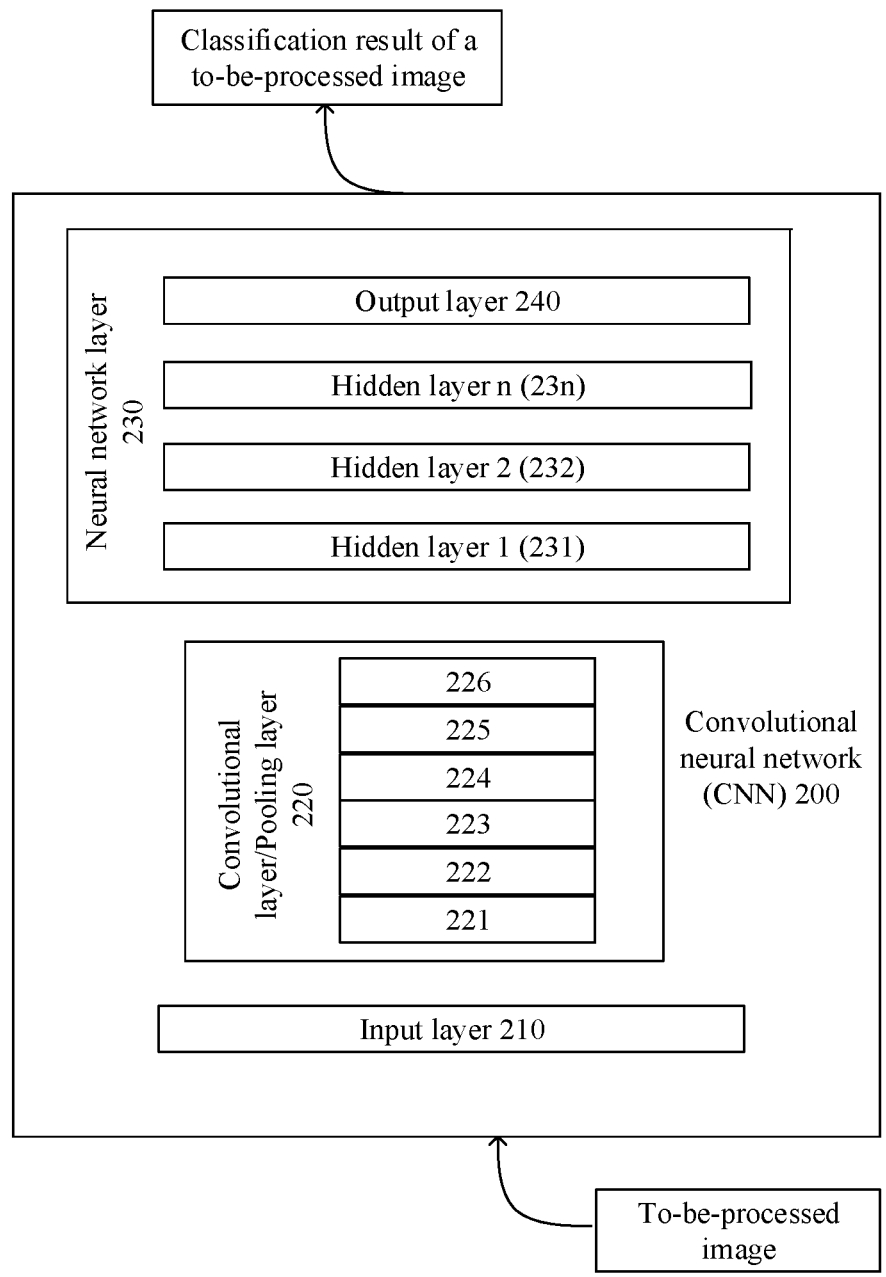
FIG. 2 is the schematic block diagram of a convolutional neural network model according to an embodiment of this application.

Because the CNN is a very common neural network, the following describes in detail a structure of the CNN with reference to FIG. 2. As described in the foregoing description of the basic concepts, the convolutional neural network is a deep neural network with a convolutional structure, and is a deep learning architecture. The deep learning architecture indicates learning at a plurality of levels at different abstract levels by using a machine learning algorithm. As a deep learning architecture, the CNN is a feed-forward artificial neural network.

Each neuron in the feed-forward artificial neural network may respond to an image input to the neuron.

As shown in FIG. 2, a convolutional neural network (CNN) 200 may include an input layer 210, a convolutional layer/pooling layer 220 (the pooling layer is optional), and a neural network layer 230. Content related to these layers is subsequently described in detail.

Convolutional Layer/Pooling Layer 220:

Convolutional Layer:

As shown in FIG. 2, for example, the convolutional layer/pooling layer 220 may include layers 221 to 226. For example, in an implementation, the layer 221 is a convolutional layer, the layer 222 is a pooling layer, the layer 223 is a convolutional layer, the layer 224 is a pooling layer, the layer 225 is a convolutional layer, and the layer 226 is a pooling layer. In another implementation, the layer 221 and the layer 222 are convolutional layers, the layer 223 are a pooling layer, the layer 224 and the layer 225 are convolutional layers, and the layer 226 is a pooling layer. In other words, output of the convolutional layer may be used as input of the subsequent pooling layer, or may be used as input of another convolutional layer to continue a convolution operation.

The following uses the convolutional layer 221 as an example to describe internal working principles of a convolutional layer.

The convolutional layer 221 may include many convolution operators. The convolution operator is also referred to as a kernel. A function of the convolution operator in image processing is equivalent to a filter for extracting specific information from an input image matrix. The convolution operator may be essentially a weight matrix. The weight matrix is usually predefined. In a process of performing a convolution operation on an image, the weight matrix is usually used to process pixels on the input image one pixel after another pixel (or two pixels after two other pixels, or the like, which depends on a value of a stride) in a horizontal direction, to complete extracting a specific feature from the image. A size of the weight matrix should be related to a size of the image. It should be noted that a depth dimension of the weight matrix is the same as a depth dimension of the input image. In a process of performing a convolution operation, the weight matrix extends to an entire depth of the input image. Therefore, when convolution is performed on an input image matrix and a single weight matrix, convolution output of a single depth dimension is generated. However, in most cases, a single weight matrix is not used, and a plurality of weight matrices with the same size (row×column) are used instead, that is, a plurality of homomorphic matrices. Outputs of these weight matrix are superposed to form the depth dimension of the convolution image. It may be understood that the dimension herein may depend on "the plurality of", that is, a quantity of "weight matrices", described above. Different weight matrices may be used to extract different features in the image. For example, one weight matrix is used to extract image edge information, another weight matrix is used to extract a specific color of the image, and still another weight matrix is used to blur unneeded noise in the image. The plurality of weight matrices have the same size (row×column). Feature diagrams obtained after extraction of the plurality of weight matrices with the same size also have the same size. Then, the feature diagrams with the same size obtained after the extraction are combined to form output of the convolution operation.

Weight values in these weight matrices need to be obtained through a large amount of training in actual application. Each trained weight matrix formed by weight values may be used to extract information from an input image, so that the convolutional neural network 200 performs correct prediction.

When the convolutional neural network 200 has a plurality of convolutional layers, a large quantity of general features are often extracted at an initial convolutional layer (for example, the layer 221). The general features may also be referred to as low-level features. As a depth of the convolutional neural network 200 deepens, features extracted at a later convolutional layer (for example, the layer 226) are more complex, for example, features such as a high-level semantics feature. A higher-level semantics feature is more applicable to a to-be-resolved problem.

Pooling Layer/Pooling Layer 220:

A quantity of training parameters usually needs to be reduced. Therefore, the pooling layer usually needs to be periodically introduced after the convolutional layer. At each layer of the layer 221 to the layer 226 shown in 220 in FIG. 2, one convolutional layer may be followed by one pooling layer, or one or more pooling layers may be followed by a plurality of convolutional layers. In an image processing process, a unique purpose of the pooling layer is to reduce a space size of an image. The pooling layer may include an average pooling operator and/or a maximum pooling operator, to sample an input image to obtain an image with a smaller size. The average pooling operator may calculate a pixel value of an image in a specific range to generate an average value and use the average value as an average pooling result. The maximum pooling operator may use a pixel with a maximum value in a specific range as a maximum pooling result in the range. In addition, the operator in the pooling layer should be related to the size of the image. This is similar to the foregoing description in which the size of the weight matrix in the convolutional layer should be related to the size of the image. A size of an image output after processing at the pooling layer may be less than a size of the image input to the pooling layer. Each pixel in the image output by the pooling layer represents an average value or a maximum value of a corresponding sub-area of the image that is input to the pooling layer.

Neural Network Layer 230:

After the processing at the convolutional layer/pooling layer 220, the convolutional neural network 200 still cannot output required output information. As previously described, the reason is that the convolutional layer/pooling layer 220 only extracts features and reduces parameters brought by an input image. However, to generate the final output information (required class information or other related information), the convolutional neural network 200 needs to use the neural network layer 230 to generate output of a quantity of one required category or a group of required categories. Therefore, the neural network layer 230 may include the plurality of hidden layers (layers 231 and 232 to 23n shown in FIG. 2) and the output layer 240. Parameters included in the plurality of hidden layers may be obtained through pre-training based on training data related to a specific task type. For example, the task type may include image recognition, image classification, and super-resolution image reconstruction.

A final layer of the entire convolutional neural network 200 following the plurality of hidden layers in the neural network layers 230 is the output layer 240. The output layer 240 has a function similar to a classification cross entropy loss function that is specifically used to calculate a prediction error. Once forward propagation of the entire convolutional neural network 200 (as shown in FIG. 2, propagation in a direction from the layer 210 to the layer 240 is forward propagation) is completed, the weight values and the biases of the layers mentioned above are updated in back propagation (as shown in FIG. 2, propagation in a direction from the layer 240 to the layer 210 is back propagation), to reduce a loss of the convolutional neural network 200 and an error between an ideal result and the result output by the convolutional neural network 200 by using the output layer.

It should be noted that the convolutional neural network 200 shown in FIG. 2 is merely an example of a convolutional neural network. In specific application, the convolutional neural network may further exist in a form of another network model.

In this application, the image classification model may include the convolutional neural network 200 shown in FIG. 2. The image classification model may process a to-be-processed image to obtain a classification result of the to-be-processed image.

Figure 3:
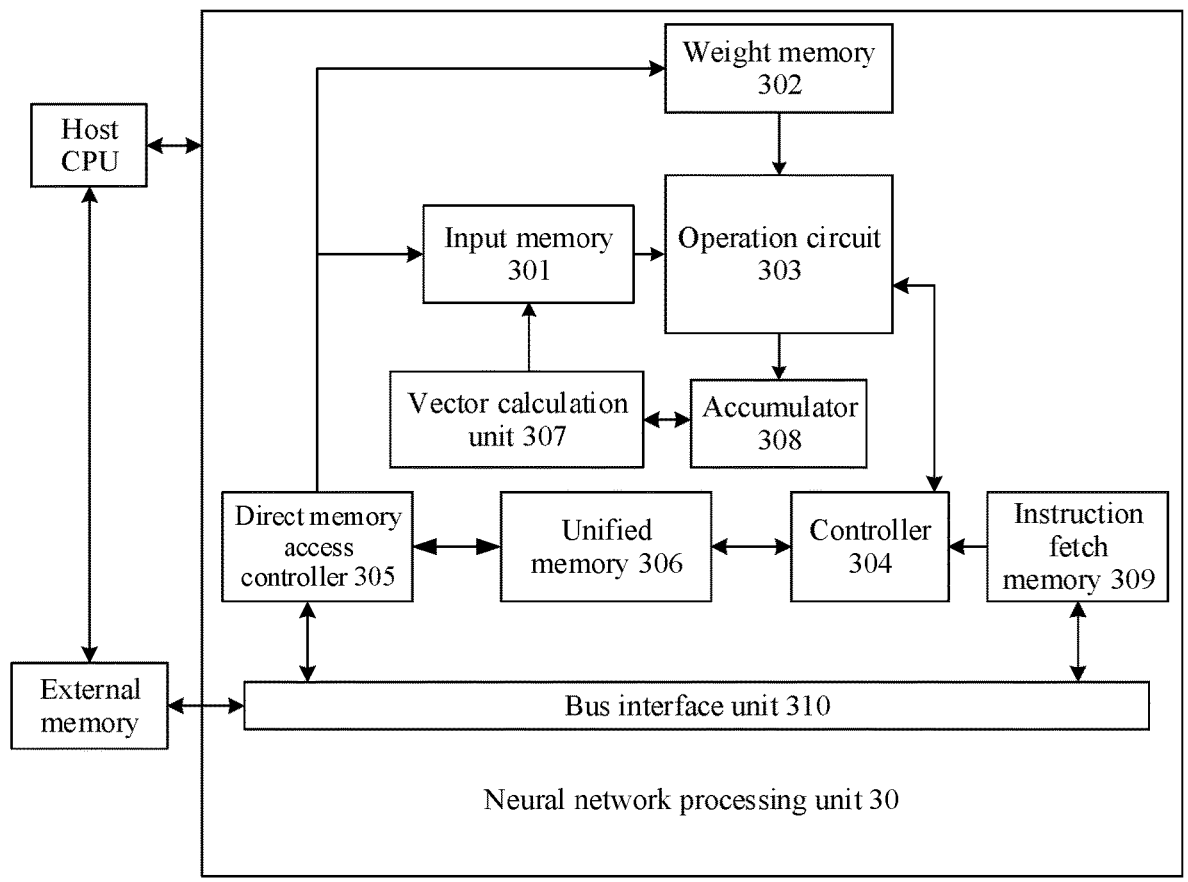
FIG. 3 is a schematic diagram of a hardware structure of a chip according to an embodiment of this application.

FIG. 3 shows a hardware structure of a chip according to an embodiment of this application. The chip includes a neural network processing unit 30. The chip may be disposed in the execution device 110 shown in FIG. 1, to complete calculation performed by the calculation module 111. The chip may alternatively be disposed in the training device 120 shown in FIG. 1, to complete training performed by the training device 120 and output the target model/rule 101. An algorithm of each layer in the convolutional neural network shown in FIG. 2 may be implemented in the chip shown in FIG. 3. Optionally, the convolutional neural network may be one of the (one or more) neural networks included in the foregoing image classification model.

The neural network processing unit NPU 30 is mounted to a host CPU as a coprocessor. A task is allocated by the host CPU. A core part of the NPU is an operation circuit 303. A controller 304 controls the operation circuit 303 to extract data from a memory (a weight memory or an input memory) and perform an operation.

In some implementations, the operation circuit 303 includes a plurality of processing elements (process engine, PE). In some implementations, the operation circuit 303 is a two-dimensional systolic array. The operation circuit 303 may alternatively be a one-dimensional systolic array or another electronic circuit that can perform arithmetical operations such as multiplication and addition. In some implementations, the operation circuit 303 is a general-purpose matrix processor.

For example, it is assumed that there are an input matrix A, a weight matrix B, and an output matrix C. The operation circuit 303 extracts data corresponding to the matrix B from a weight memory 302, and caches the data on each PE in the operation circuit 303. The operation circuit 303 extracts data of the matrix A from an input memory 301, performs a matrix operation on the data of the matrix A and the matrix B, and stores some results or a final result of an obtained matrix in an accumulator 308.

A vector calculation unit 307 may perform further processing such as vector multiplication, vector addition, an exponent operation, a logarithm operation, or value comparison on output of the operation circuit 303. For example, the vector calculation unit 307 may be configured to perform network calculation such as pooling, batch normalization, or local response normalization at a non-convolutional/non-FC layer in a neural network.

In some implementations, the vector calculation unit 307 can store a processed output vector in a unified cache 306. For example, the vector calculation unit 307 may apply a non-linear function to the output of the operation circuit 303, for example, to a vector of an accumulated value, to generate an activation value. In some implementations, the vector calculation unit 307 generates a normalized value, a combined value, or both. In some implementations, the processed output vector can be used as activation input of the operation circuit 303, for example, to be used in a subsequent layer in the neural network.

The unified memory 306 is configured to store input data and output data.

For weight data, a direct memory access controller 305 (DMAC) is directly used to transfer input data in an external memory to the input memory 301 and/or the unified memory 306, store weight data in the external memory into the weight memory 302, and store the data in the unified memory 306 into the external memory.

A bus interface unit (BIU) 310 is configured to implement interaction between the host CPU, the DMAC, and an instruction fetch memory 309 by using a bus.

The instruction fetch memory (instruction fetch buffer) 309 connected to the controller 304 is configured to store instructions used by the controller 304.

The controller 304 is configured to invoke the instructions cached in the instruction fetch memory 309, to implement a working process of controlling an operation accelerator.

Generally, the unified memory 306, the input memory 301, the weight memory 302, and the instruction fetch memory 309 each are an on-chip memory. The external memory is a memory outside the NPU. The external memory may be a double data rate synchronous dynamic random access memory (DDR SDRAM for short), a high bandwidth memory (HBM), or another readable and writable memory.

The operation at each layer in the convolutional neural network shown in FIG. 2 may be performed by the operation circuit 303 or the vector calculation unit 307.

The execution device 110 in FIG. 1 described above can perform steps of the image classification method in the embodiments of this application. Optionally, the execution device 110 in FIG. 1 may include the CNN model shown in FIG. 2 and the chip shown in FIG. 3. The following describes in detail the image classification method in the embodiments of this application with reference to the accompanying drawings.

Figure 4:
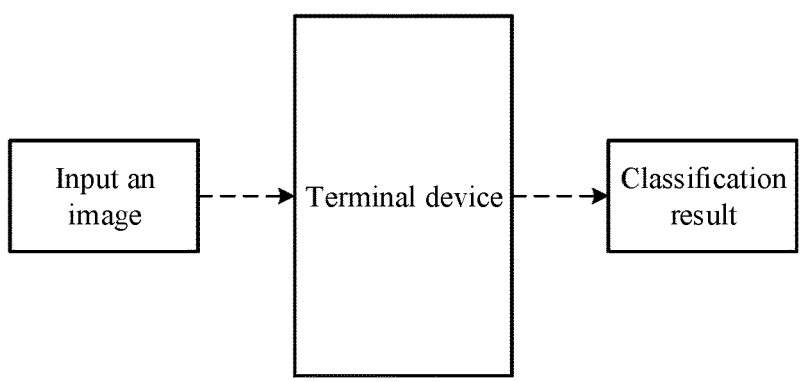
FIG. 4 is a schematic diagram of an application scenario according to an embodiment of this application.

The image classification method provided in the embodiments of this application may be performed on a server, may be performed on a cloud, or may be performed on a terminal device. The terminal device is used as an example. As shown in FIG. 4, the technical solutions in the embodiments of the present invention may be applied to the terminal device. The image classification method in the embodiments of this application may be used to implement image classification on an input image to obtain a classification result of the input image. The terminal device may be mobile or fixed. For example, the terminal device may be a mobile phone, a tablet personal computer (TPC), a media player, a smart television, a laptop computer (LC), a personal digital assistant (PDA), a personal computer (PC), a camera, a video camera, a smart watch, a wearable device (WD), or a self-driving car. This is not limited in the embodiments of the present invention.

Image (or picture) classification is a basis for various image processing applications. Computer vision often relates how to classify an obtained image. However, training an image classification model requires a large amount of labeled training data. For an image class (for example, a novel class) with few training samples, image classification or image recognition usually cannot be effectively performed on an image belonging to this class. In many cases, it is very difficult to obtain valid data, for example, in a medical field or a security field.

For the foregoing problem, the embodiments of this application provide the image classification method and the image classification model training method. Therefore, image classification or image recognition can also be well implemented for the novel class with few training samples (few-shot).

Figure 5:
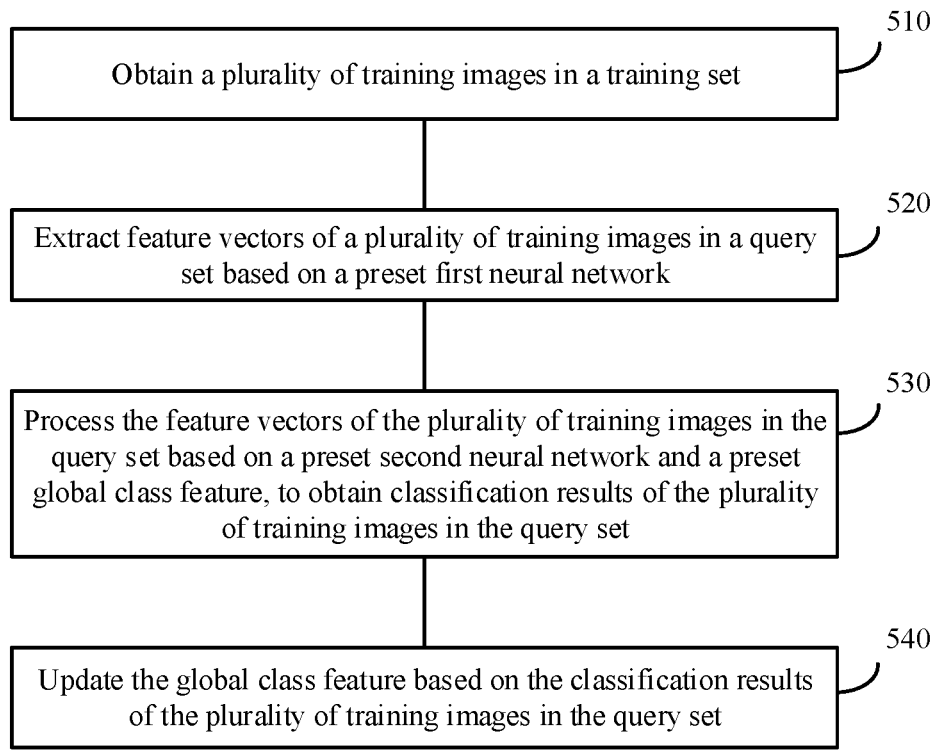
FIG. 5 is a schematic flowchart of an image classification model training method according to an embodiment of this application.

FIG. 5 is a schematic flowchart of an image classification model training method 500 according to an embodiment of this application. The method shown in FIG. 5 may be performed by a device with a strong operation capability, for example, a computer device, a server device, or an operation device. For example, the method may be performed by the terminal device in FIG. 4. The method shown in FIG. 5 includes step 510, step 520, step 530, and step 540. The following describes these steps in detail.

S510. Obtain a plurality of training images in a training set.

The training set may be a set of all training images used during training.

Optionally, the training set includes images in a base class and images in a novel class, and each class in the base class includes training images far more than those included in each class in the novel class.

Herein, "far more" may be understood as follows: A quantity of training images included in each class in the base class is at one order of magnitude higher than a quantity of training images included in each class in the novel class. In other words, the quantity of training images included in each class in the base class is at least 10 times higher than the quantity of training images included in each class in the novel class.

For example, the base class includes 100 classes, and each class includes 1000 training images. The novel class includes five classes, and each class includes five training images.

Optionally, for an image classification model in this application, model training may be performed according to an episodic training policy. For example, a model training process may be divided into a plurality of training episodes. In each training episode, several classes in the training set may be randomly selected to train the model. Finally, the image classification model training is completed after the plurality of training episodes. For details of the description of the episodic training, refer to the conventional technology. Details are not described herein.

Specifically, a global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to obtain a better image classification result.

In the image classification model training method in this embodiment of this application, an impact generated in the model training process due to a difference between a sample quantity in the base class and a sample quantity in the novel class can be better balanced. Detailed description of the image classification model training method in this application may be provided in a method 700 in FIG. 7.

Based on the episodic training policy, the method 500 in this application may be divided into a plurality of training episodes. Correspondingly, step S510 may indicate that, in a training episode, a plurality of training images in the training set are randomly selected, and the plurality of selected training images in the training set are divided into a support set and a query set.

Therefore, it may also be said that the training set includes the support set and the query set. The plurality of training images in the training set include a plurality of training images in the support set and a plurality of training images in the query set.

S520. Extract feature vectors of the plurality of training images in the query set based on a preset first neural network.

The feature vector of the training image may be used to indicate a visual feature (or an image feature) of the training image. The query set includes some images in some classes in the training set.

Optionally, when the feature vectors of the plurality of training images in the query set are extracted, feature vectors of the plurality of training images in the support set may also be extracted.

Optionally, the first neural network may be obtained through training the system 100 shown in FIG. 1.

Optionally, the first neural network may be the convolutional neural network shown in FIG. 2.

S530. Process the feature vectors of the plurality of training images in the query set based on a preset second neural network and the preset global class feature, to obtain classification results of the plurality of training images in the query set.

It should be understood that the classification result herein may indicate a label of a class to which the image belongs.

Optionally, the second neural network may be obtained through training the system 100 shown in FIG. 1.

Optionally, the second neural network may be the convolutional neural network shown in FIG. 2.

The global class feature includes a plurality of class features. The class features in the global class feature are used to indicate visual features of all classes in the training set. All the classes in the training set are classes to which all the training images in the training set belong.

In this application, the processing the feature vectors of the plurality of training images in the query set based on a preset second neural network and the preset global class feature, to obtain classification results of the plurality of training images in the query set may include: extracting the feature vectors of the plurality of training images in the support set; determining local class feature of the training images based on the feature vectors of the plurality of training images in the support set; and determining the classification results of the plurality of training images in the query set based on the second neural network, the local class feature of the training images, and the global class feature.

A plurality of class features in the local class feature of the training images are used to indicate visual features of all classes in the support set. The support set includes some training images in some classes in the training set. The query set includes some training images in some classes in the training set.

Optionally, a class in the support set may be the same as a class in the query set.

Figure 6:
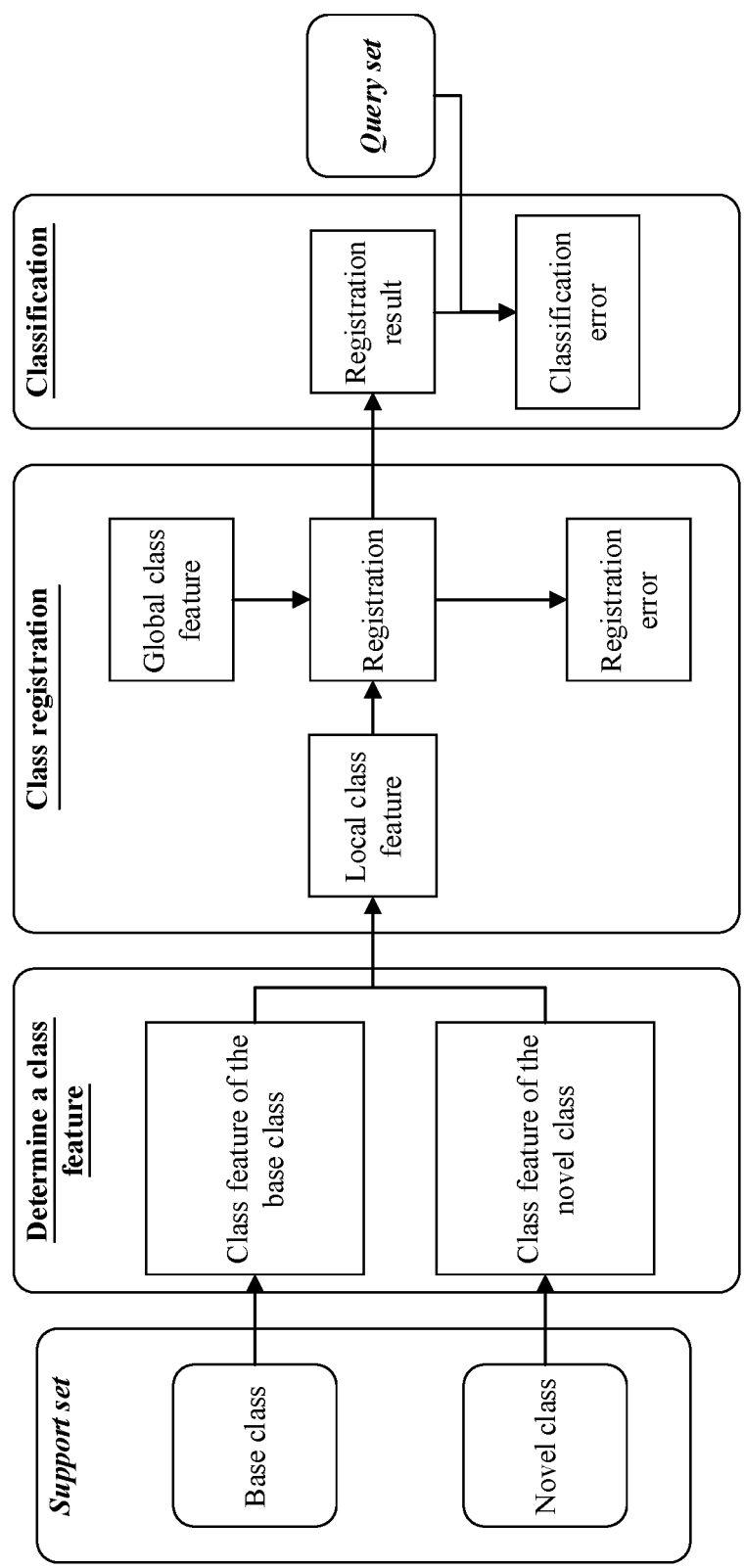
FIG. 6 is a schematic block diagram of an image classification model training method according to an embodiment of this application.

The following describes in detail the step of determining the classification results in step S530 with reference to FIG. 6.

As shown in FIG. 6, the plurality of training images in the training set are divided into the support set and the query set. The plurality of training images in the support set may include images in the base class and images in the novel class.

It should be noted that, in a training episode, the support set and the query set each are determined through randomly selecting a plurality of training images in the training set. The training set includes the images in the base class and the images in the novel class. Therefore, the plurality of training images in the support set may include only images in the base class, or the plurality of training images in the support set may include only images in the novel class.

As shown in FIG. 6, class features of the plurality of training images in the base class in the support set and class features of the plurality of training images in the novel class in the support set may be determined. For example, a feature vector of each training image in the base class may be determined, and an average value of feature vectors of a plurality of training images that belong to the same class may be obtained. In this case, the average value may be used as a class feature of the class. A method for determining the class features of the plurality of training images in the novel class is not described herein.

In particular, before the class features of the plurality of training images in the novel class are determined, image expansion processing such as cropping processing (cropping), flipping processing (flipping), and/or data hallucination processing (hallucinator) may be performed on the plurality of training images in the novel class, to obtain more images in the novel class.

In this application, the (obtained) class features (including the class features of the plurality of training images in the base class and/or the class features of the plurality of training images in the novel class) may be referred to as a local class feature (local class representations) of the training images.

It may be learned that the local class feature of the training images is determined based on a plurality of training images randomly selected (in the support set) in one training episode. In other words, the local class feature is used only in one training episode in the model training process. Therefore, the local class feature may also be referred to as an episodic class feature (episodic class representation). Alternatively, the local class feature may have another name. This is not limited in this application.

Different from the local class feature, the global class feature (global class representation) may be considered as a parameter of the image classification model and share class features of all the classes in the training set. Therefore, the global class feature may be used in the plurality of training episodes in the model training process.

Optionally, after the local class feature of the training images is obtained, the local class feature of the training images may be registered to the global class feature, to obtain a registration result, that is, the registered global class feature.

Registration herein may also be understood as finding a class feature that is in the global class feature and that corresponds to each class feature in the local class feature. For example, a class feature with highest similarity to each class feature in the local class feature is found in the global class feature.

Further, a registration error may be determined based on similarity between each class feature in the local class feature and the class feature that is in the global class feature and that corresponds to each class feature.

Specifically, the registration error may be determined based on the similarity between each class feature in the local class feature and the class feature that is in the global class feature and that corresponds to the foregoing class feature. In other words, the registration error in the current training episode is determined based on the local class feature of the training images and the plurality of class features in the global class feature.

Optionally, the second neural network may be used to perform dimension reduction processing on the registration result, to process the feature vectors of the plurality of training images in the query set in low-dimensional vector space.

In this application, the registration result may be used to predict each training image in the query set, to obtain a classification result of each training image in the query set.

Specifically, the classification result of the training image may be predicted by using a method of a closest distance.

For example, a distance between a class feature in the registration result and a feature vector of each training image in the query set may be calculated, and normalization processing may be performed on each distance, to obtain a probability that each of the training images belongs to a class indicated by the class feature in the registration result, that is, the classification result of each training image in the query set.

Further, a classification error may be obtained through comparing the classification result of each training image with a pre-tagged label of the training image. The pre-tagged label is used to indicate a real class to which the training image belongs. In other words, the classification errors in the current training episode are determined based on the classification results of the plurality of training images and the pre-tagged labels of the plurality of training images.

S540. Update the global class feature based on the classification results of the plurality of training images in the query set.

In this application, the global class feature, the first neural network, and the second neural network may be updated based on the classification results of the plurality of training images in the query set.

Optionally, the global class feature may be updated based on the classification errors. Optionally, the classification errors may be determined based on the classification results of the plurality of training images by using the method in step S530.

Further, the global class feature, the first neural network, and the second neural network may be updated based on the classification errors.

Optionally, the global class feature may be updated based on the classification errors and the registration error. Optionally, the classification errors may be determined based on the local class feature of the training images and the plurality of class features in the global class feature by using the method in step S530.

Further, the global class feature, the first neural network, and the second neural network may be updated based on the classification errors and the registration error.

In this application, the global class feature may be updated in the plurality of training episodes in the model training process, so that the global class feature obtained through training can be better consistent. In addition, the training set includes the images in the base class and the images in the novel class. An effect generated in the training process of (the training images in) the novel class may accumulate with the global class feature. Therefore, the trained image classification model can be avoided from being overfit to the base class. The to-be-processed image is classified based on the image classification model, to more accurately identify the images in the novel class.

Figure 7:
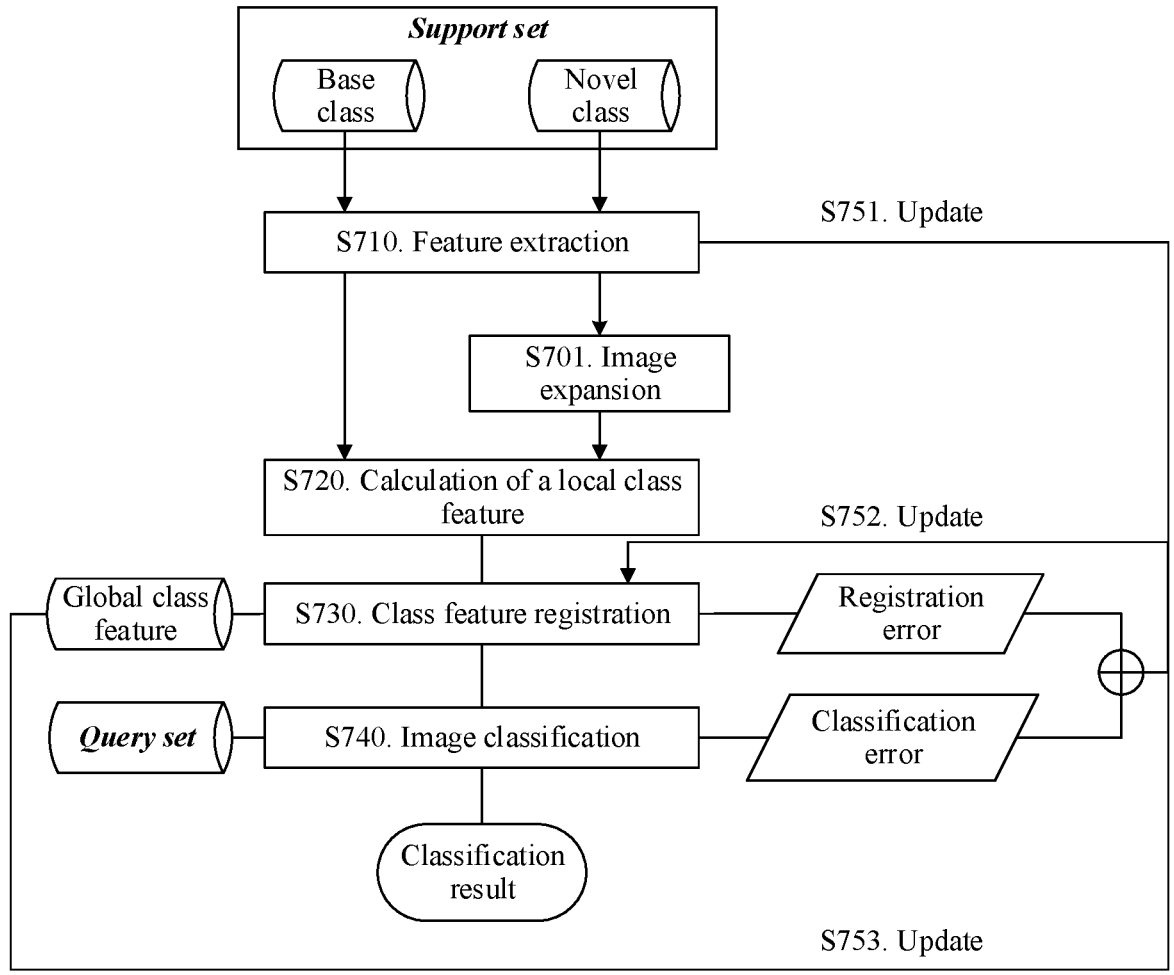
FIG. 7 is a schematic flowchart of an image classification model training method according to another embodiment of this application.

FIG. 7 is a schematic flowchart of an image classification model training method 700 according to another embodiment of this application. The method shown in FIG. 7 may be performed by a device with a strong operation capability, for example, a computer device, a server device, or an operation device. For example, the method may be performed by the terminal device in FIG. 4. The following describes each step in the method 700 in detail.

S710. Feature extraction (module)

Feature vectors of a plurality of training images in a support set are extracted. The plurality of training images include images in a base class and images in a novel class.

Optionally, the feature vectors of the plurality of training images in the support set may be extracted by using a first neural network.

For example, it is assumed that there is a group of (a plurality of) training images. These training images may be used to train an image classification model. A total of $C_{total}=\{C_1, \ldots, C_N\}$ classes are included. Herein, N indicates a total quantity of classes, a $c_j$ class includes $k_j$ training images, and j is an integer. A training set $D_{train}$ may be obtained based on the plurality of training images. The training set $D_{train}$ includes images in the base class and images in the novel class.

In a current training episode, $C_{train}$ classes are randomly selected from the training $D_{train}$; $n_s$ set training images are selected from each class to form the support set $S=\{(x_i,y_i), i=1,\ldots,n_s \times C_{train}\}$, where $y_i$ is a label of an $i^{th}$ training image $x_i$, and $C_{train}$ is a quantity of extracted classes; and $C_{train}$ classes are selected from the $C_{total}$ classes in the training set $D_{train}$ to form the query set $Q=\{(x_q,y_q), q=1,\ldots,n_q \times C_{train}\}$, where each class includes $n_q$ training images, and $n_s$ and $n_q$ are positive integers.

Optionally, $F(\cdot)$ may be used to indicate feature extraction. In this case, a feature vector of the $i^{th}$ to training image $x_i$ in the training set $D_{train}$ is $f_i=F(x_i)$. Herein, i is an integer.

S701. Image expansion

Optionally, for the novel class in the support set, image expansion processing such as cropping processing (cropping), flipping processing (flipping), and/or data hallucination processing (hallucinator) may be performed on the images in the novel class, to obtain more images in the novel class.

It should be noted that, in the training set $D_{train}$, each novel class includes only $n_{few}$ training images, and $n_{few}$ is usually less than $n_s+n_q$.

Therefore, in step S701, the n few training images in the novel class need to be expanded to $n_s+n_q$ training images; and then, $n_s$ training images are put into the support set, and $n_q$ training images are put into the query set.

S720. Calculation of a local class feature

Optionally, for the plurality of training images in the support set, an average value of feature vectors of a plurality of training images that belong to the same class is calculated. The average value may be used as a class feature of the class.

A class feature of a class to which all the training images in the support set belong is calculated, to obtain a local class feature of the training images. This is denoted as $R=\{r_{c_i}, c_i \in C_{train}\}$. Herein, $r_{c_i}$ is a class feature of a $c_j^{th}$ class in the support set.

S730. Class feature registration (module)

Optionally, the local class feature of the training images is registered to a global class feature, to obtain a registration result.

Alternatively, a class feature that is in a global class feature and that corresponds to each class feature in the local class feature is found.

For example, the global class feature is denoted as $G=(g_{c_j}, c_j \in C_{total})$. Herein, $g_{c_i}$ is a class feature of a $c_j^{th}$ class in the training set.

For a $j^{th}$ class feature $f_i$ in the local class feature and a $j^{th}$ class feature $g_{c_j}$ in the global class feature, similarity between the class feature $f_i$ in the local class feature and the class feature $g_{c_j}$ in the global class feature may be calculated in low-dimensional embedding space (embedding space), to obtain a vector $V_i=[v_i^j, \ldots, v_i^N]^T$. Herein, a $j^{th}$ element $v_i^j$ represents the similarity between $f_i$ and $g_{c_j}$.

For example, the following formula may be used to calculate the similarity $v_i^j$.

$$v_i^j = -\|\theta(f_i) - \phi(g_{c_j})\|^2$$

Herein, $\theta(\cdot)$ is an embedding function of a visual feature of a training image, and $\phi(\cdot)$ is an embedding function of a global class feature.

In this case, the class feature $g_{c_j}$ with highest similarity to the class feature $f_i$ in the global class feature is the global class feature corresponding to the class feature $f_i$.

Further, a registration error may be determined based on similarity between each class feature in the local class feature and the class feature that is in the global class feature and that corresponds to each class feature.

For example, in this application, a loss function $L_{reg}$ of the training image $x_i$ may be used as a registration error, so that the training image most approximates the global class feature of the training image in the low-dimensional embedding space. A formula for calculating the loss function $L_{reg}$ is as follows:

$$L_{reg} = CE(y_i, V_i)$$

Herein, $CE(\cdot)$ is a cross entropy loss, and $y_i$ is a label of the training image $x_i$.

Therefore, a registration error of a local class feature $r_{c_i}$ of a $c_j^{th}$ to class may be calculated according to the following formulas:

$$L_{reg}(r_{c_i}) = CE(c_i, V_i)$$
$$v_i^j = -\|\theta(r_{c_i}) - \phi(g_{c_j})\|^2, c_j \in C_{total}$$

Next, a softmax function may be used to perform normalization processing on $V_i=[v_i^1, \ldots, v_i^N]^T$, to obtain probability distribution $P_i=[p_i^1, \ldots, p_i^N]^T$, of each class. The probability distribution $P_i$ is used as a weight, to estimate a weighed sum of class features of all classes (in the global class feature). The weighed sum is used as a class representation of the $i^{th}$ class in the $C_{train}$ classes in the current training episode, and is denoted as $\xi_i$, that is, $\xi_i=P_iG$. $\xi_i$ is the registration result in the foregoing embodiment.

S740. Image classification

Optionally, the registration result may be used to predict each training image in the query set, to obtain a classification result of each training image in the query set.

Further, the classification error may be obtained through comparing the classification result of each training image with a pre-tagged label (a real label) of the training image.

For example, for a given class feature $\xi_i$, a loss function $L_{fsl}$ may be used as a classification error of a training image $(x_k, y_k)$ in the query set. The loss function $L_{fsl}$ may be shown in the following formulas:

$$L_{fsl} = CE(y_k, W_k)$$
$$w_k^i = -\|F(x_k) - \xi_i\|^2, c_i \in C_{train}$$

Herein, $W_k = [w_k^1, \ldots, w_k^{n_{train}}]^T$ represents similarity between the training image $x_k$ in the query set and an estimated global class feature $\xi_i$.

In this case, a class corresponding to $w_k^i$ with highest similarity may be used as a class of the training image $x_k$, that is, a classification result of the training image $x_k$.

S750. Image classification model update

Optionally, the image classification model may be updated by using the registration error and/or the classification error.

For example, in this application, the registration error ($L_{reg}$) and the classification error ($L_{fsl}$) may be combined. A total loss function $L_{total}(\cdot)$ of a plurality of training episodes may be calculated according to the following formula:

$$L_{total}(S, Q) = \sum_{c_i \in C_{train}} L_{reg}(r_{c_i}) + \sum_{(x_k, y_k) \in Q} L_{fsl}(x_k)$$

Optionally, step S750 may include at least one of steps S751, S752, and S753.

S751. Feature extraction (module) update

Optionally, the feature extraction (model) may be updated by using the registration error ($L_{reg}$), the classification error ($L_{fsl}$), and/or the total loss function ($l_{total}$).

S752. Class feature registration (module) update Optionally, the class feature registration (module) may be updated by using the registration error ($L_{reg}$) the classification error ($L_{fsl}$), and/or the total loss function ($l_{total}$).

S753. Global class feature update

Optionally, the global class feature may be updated by using the registration error ($L_{reg}$), the classification error ($L_{fsl}$), and/or the total loss function ($l_{total}$).

Figure 8:
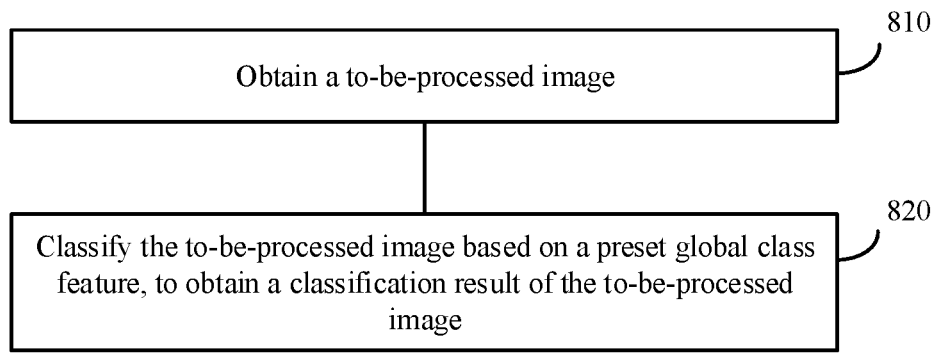
FIG. 8 is a schematic flowchart of an image classification method according to an embodiment of this application.

FIG. 8 is a schematic flowchart of an image classification method 800 according to an embodiment of this application. The method shown in FIG. 8 may be performed by a device with a strong operation capability, for example, a computer device, a server device, or an operation device. For example, the method may be performed by the terminal device in FIG. 4. The method shown in FIG. 8 includes step 810 and step 820. The following describes these steps in detail.

S810. Obtain a to-be-processed image.

Optionally, when the method 800 shown in FIG. 8 is performed by the terminal device in FIG. 4, the to-be-processed image may be an image taken by the terminal device by using a camera. Alternatively, the to-be-processed image may be an image obtained from the terminal device, for example, an image stored in an album of the terminal device, or an image obtained by the terminal device from a cloud.

S820. Classify the to-be-processed image based on a preset global class feature, to obtain a classification result of the to-be-processed image.

The global class feature includes a plurality of class features obtained through training based on a plurality of training images in a training set. The plurality of class features in the global class feature are used to indicate visual features of all classes in the training set. All the classes in the training set are classes to which all the training images in the training set belong. The training set includes images in a base class and images in a novel class.

Optionally, the classifying the to-be-processed image based on a preset global class feature, to obtain a classification result of the to-be-processed image may include: extracting a feature vector of the to-be-processed image; determining, based on the feature vector of the to-be-processed image, confidence that the to-be-processed image belongs to a candidate class, where the candidate class is one or more of a plurality of classes indicated by the global class feature; and determining the classification result of the to-be-processed image from the candidate class based on the confidence.

Optionally, before the determining, based on the feature vector of the to-be-processed image, confidence that the to-be-processed image belongs to a candidate class, the method may further include: determining a local class feature of the to-be-processed image based on a support set of the to-be-processed image; and determining the candidate class based on the local class feature of the to-be-processed image and the global class feature.

The support set of the to-be-processed image includes a plurality of images, and a class to which the plurality of images belong is one or more of the plurality of classes indicated by the global class feature.

Optionally, the candidate class may include a class to which all training images in the support set belong.

Optionally, the determining, based on the feature vector of the to-be-processed image, confidence that the to-be-processed image belongs to a candidate class may include: determining, based on the feature vector of the to-be-processed image, a distance between the feature vector of the to-be-processed image and a feature vector corresponding to each class in the candidate class; and determining, based on the distance, the confidence that the to-be-processed image belongs to the candidate class.

Optionally, the determining the classification result of the to-be-processed image from the candidate class based on the confidence may include: determining a class with largest confidence in the candidate class as the classification result of the to-be-processed image.

It should be understood that the confidence herein may be a probability that the to-be-processed image belongs to the candidate class. Therefore, largest confidence may also indicate a highest probability that the to-be-processed image belongs to the candidate class. Optionally, the global class feature is obtained through training based on a classification error, the classification error is determined based on a classification result of a training image in a query set and a pre-tagged label of the training image in the query set, the label is used to indicate a class to which the training image belongs, and the query set includes some training images in some classes in the training set. For a specific process of determining the classification error, refer to the method 500 in FIG. 5.

Optionally, the global class feature is obtained through training based on a registration error, the registration error is determined based on a local class feature of training images and the plurality of class features in the global class feature, the local class feature of the training images includes a plurality of class features determined based on a plurality of training images in a support set, the plurality of class features in the local class feature of the training images are used to indicate visual features of all classes in the support set, and the support set includes some training images in some classes in the training set. For a specific process of determining the registration error, refer to the method 500 in FIG. 5.

Optionally, the global class feature is obtained through training based on the classification error and the registration error.

Optionally, the local class feature of the training images is determined based on the plurality of training images that are obtained after expansion processing is performed on the support set, and the expansion processing includes cropping processing, flipping processing, and/or data hallucination processing on an image.

In this application, the global class feature is obtained through training based on the classification results of the plurality of training images in the training set. The global class feature includes the plurality of class features that can indicate the visual features corresponding to all the classes in the training set. In addition, because the training set used in a global class training process includes the images in the base class and the images in the novel class, the global class feature can be avoided from being overfit to the images in the base class, to more accurately identify the images in the novel class.

Figure 9:
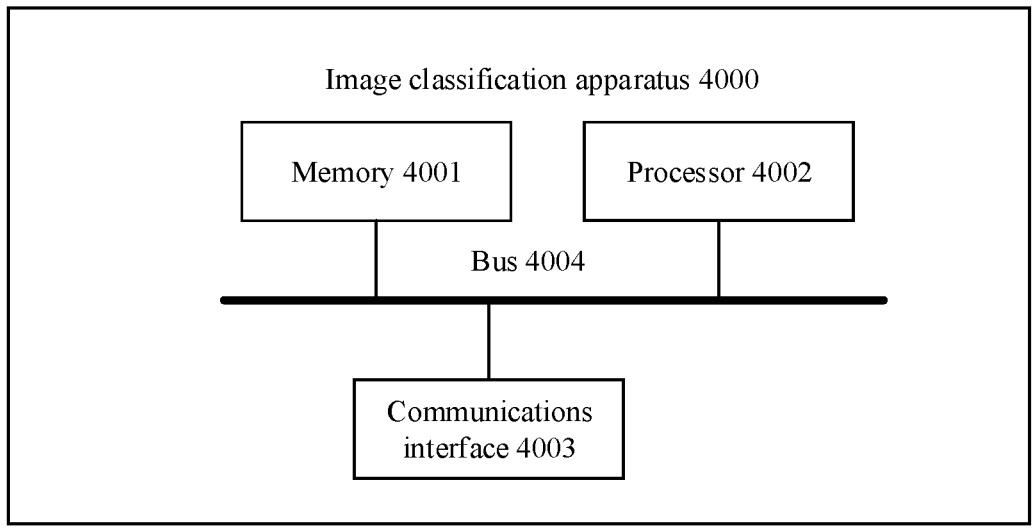
FIG. 9 is a schematic diagram of a hardware structure of an image classification apparatus according to an embodiment of this application.

FIG. 9 is a schematic diagram of a hardware structure of an image classification apparatus according to an embodiment of this application. As shown in FIG. 9, the image classification apparatus 4000 includes a memory 4001, a processor 4002, a communications interface 4003, and a bus 4004. A communication connection is implemented between the memory 4001, the processor 4002, and the communications interface 4003 by using the bus 4004.

The memory 4001 may be a read-only memory (ROM), a static storage device, a dynamic storage device, or a random access memory (RAM). The memory 4001 may store a program. When the program stored in the memory 4001 is executed by the processor 4002, the processor 4002 and the communications interface 4003 are configured to perform the steps of the image classification method in the embodiments of this application.

The processor 4002 may be a general-purpose central processing unit (CPU), a microprocessor, an application-specific integrated circuit (ASIC), a graphics processing unit (GPU), or one or more integrated circuits. The processor 4002 is configured to execute a related program, to implement functions that need to be performed by the units in the image classification apparatus in this embodiment of this application, or perform the image classification method in the embodiments of this application.

The processor 4002 may be an integrated circuit chip and has a signal processing capability. In an implementation process, the steps of the image classification method in the embodiments of this application may be completed by using an integrated logic circuit in a form of hardware or instructions in a form of software in the processor 4002.

The foregoing processor 4002 may be a general-purpose processor, a digital signal processor (DSP), an ASIC, a field-programmable gate array (FPGA) or another programmable logic device, a discrete gate or a transistor logic device, or a discrete hardware component. The foregoing general-purpose processor may be a microprocessor, or the processor may be any conventional processor, decoder, or the like. Steps of the methods disclosed with reference to the embodiments of this application may be directly executed and completed by using a hardware decoding processor, or may be executed and completed by using a combination of hardware and software modules in the decoding processor. A software module may be located in a mature storage medium in the art, such as a random access memory, a flash memory, a read-only memory, a programmable read-only memory, an electrically erasable programmable memory, or a register. A storage medium is located in the memory 4001. The processor 4002 reads information in the memory 4001, and completes, in combination with hardware of the processor 4002, the functions that need to be performed by the units included in the image classification apparatus in this embodiment of this application, or performs the image classification method in the method embodiments of this application.

The communications interface 4003 uses a transceiver apparatus, for example but not limited to, a transceiver, to implement communication between the apparatus 4000 and another device or a communications network. For example, a to-be-processed image may be obtained by using the communications interface 4003.

The bus 4004 may include a channel through which information is transmitted between components (for example, the memory 4001, the processor 4002, and the communications interface 4003) of the apparatus 4000.

Figure 10:
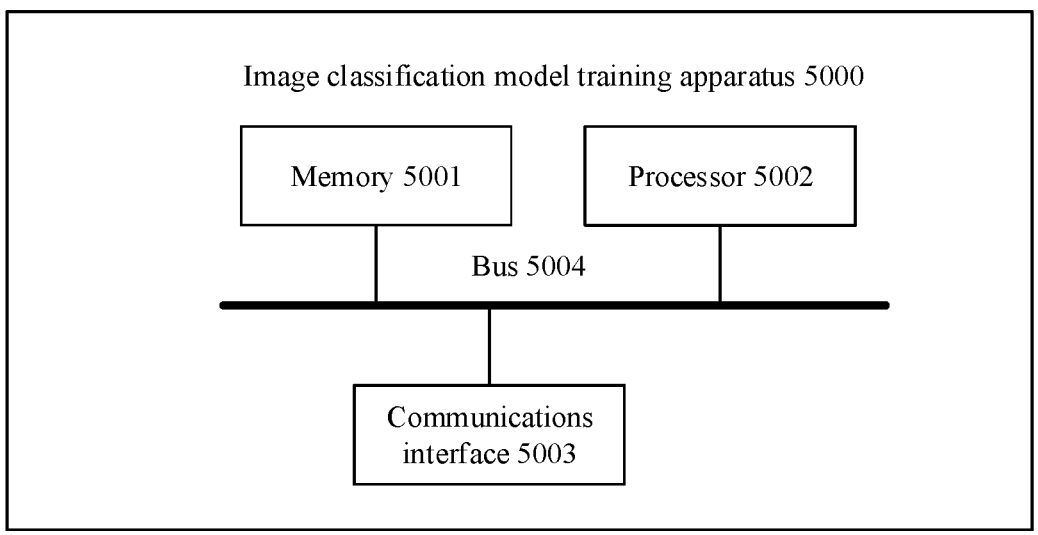
FIG. 10 is a schematic diagram of a hardware structure of an image classification model training apparatus according to an embodiment of this application.

FIG. 10 is a schematic diagram of a hardware structure of an image classification model training apparatus 5000 according to an embodiment of this application. As shown in FIG. 10, the image classification model training apparatus 5000 includes a memory 5001, a processor 5002, a communications interface 5003, and a bus 5004. The apparatus 5000 is similar to the foregoing apparatus 4000. A communication connection is implemented between the memory 5001, the processor 5002, and the communications interface 5003 by using the bus 5004.

The memory 5001 may store a program. When the program stored in the memory 5001 is executed by the processor 5002, the processor 5002 is configured to perform steps of the neural network training method in the embodiments of this application.

The processor 5002 may use a general-purpose CPU, a microprocessor, an ASIC, a GPU, or one or more integrated circuits. The processor 5002 is configured to execute a related program, to implement the image classification model training method in the embodiments of this application.

The processor 5002 may be an integrated circuit chip and has a signal processing capability. In an implementation process, the steps of the image classification model training method in the embodiments of this application may be completed by using an integrated logic circuit in a form of hardware or an instruction in a form of software in the processor 5002.

It should be understood that an image classification model is trained by using the image classification model training apparatus 5000 shown in FIG. 10. The trained image classification model may be used to perform the image classification method in the embodiments of this application. Specifically, the image classification model in the methods shown in FIG. 5 and FIG. 8 may be obtained through training the image classification model by using the apparatus 5000.

Specifically, the apparatus shown in FIG. 10 may obtain training data and a to-be-trained image classification model from the outside by using the communications interface 5003, and then the processor trains the to-be-trained image classification model based on the training data.

It should be noted that although only the memory, the processor, and the communications interface of each of the apparatuses 4000 and 5000 are illustrated, in a specific implementation process, a person skilled in the art should understand that the apparatus 4000 and the apparatus 5000 each may further include other components necessary for implementing normal operation. In addition, according to a specific requirement, a person skilled in the art should understand that the apparatus 4000 and apparatus 5000 may further include hardware components for implementing other additional functions. In addition, a person skilled in the art should understand that the apparatus 4000 and the apparatus 5000 each may include only components necessary for implementing the embodiments of this application, but not necessarily include all the components shown in FIG. 9 and FIG. 10.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

All or some of the foregoing embodiments may be implemented through software, hardware, firmware, or any combination thereof. When software is used to implement the embodiments, the foregoing embodiments may be implemented completely or locally in a form of a computer program product. The computer program product includes one or more computer instructions or computer programs. When the program instructions or the computer programs are loaded and executed on the computer, the procedure or functions according to the embodiments of this application are all or locally generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification is merely an association relationship for describing associated objects, and indicates that three relationships may exist. For example, A and/or B may represent three cases: only A exists, both A and B exist, and only B exists, where A, B can be singular or plural. In addition, in this specification, the character "/" generally indicates that an "or" relationship or an "and/or" relationship exists between associated objects. For details, refer to the foregoing and the following descriptions.

In this application, "at least one" indicates one or more, and "a plurality of" indicates two or more. "At least one of the following" or a similar expression thereof means any combination of these items, including any combination of a single item or a plurality of items. For example, at least one of a, b, and c may represent a, b, c, a and b, a and c, b and c, or a and b and c. Herein, a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the unit is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image classification method, applied to an image classification apparatus comprising a processor and a memory, the method comprising:
    obtaining a to-be-processed image; and
    classifying the to-be-processed image, based on a preset global class feature, to obtain a classification result of the to-be-processed image,
        wherein the preset global class feature comprises a plurality of class features obtained through training based on a plurality of training images in a training set,
        wherein the plurality of class features in the preset global class feature are used to indicate visual features of all classes in the training set,
        wherein all the classes in the training set are classes to which all the training images in the training set belong, and
        wherein the training set comprises images in a base class and images in a novel class.

2. The method according to claim 1, wherein classifying the to-be-processed image, based on the preset global class feature, to obtain the classification result of the to-be-processed image comprises:
    extracting a feature vector of the to-be-processed image;
    determining, based on the feature vector of the to-be-processed image, confidence that the to-be-processed image belongs to a candidate class,
        wherein the candidate class is one or more of the plurality of classes indicated by the preset global class feature; and
    determining the classification result of the to-be-processed image from the candidate class based on the confidence.

3. The method according to claim 2, wherein before determining, based on the feature vector of the to-be-processed image, confidence that the to-be-processed image belongs to the candidate class, the method further comprises:
    determining a local class feature of the to-be-processed image based on a support set of the to-be-processed image; and
    determining the candidate class based on the local class feature of the to-be-processed image and the preset global class feature,
        wherein the support set of the to-be-processed image comprises a plurality of images, and
        wherein a class to which the plurality of images belong is one or more of the plurality of classes indicated by the preset global class feature.

4. The method according to claim 2, wherein determining, based on the feature vector of the to-be-processed image, confidence that the to-be-processed image belongs to the candidate class comprises:
    determining, based on the feature vector of the to-be-processed image, a distance between the feature vector of the to-be-processed image and a feature vector associated with each class in the candidate class; and
    determining, based on the distance, the confidence that the to-be-processed image belongs to the candidate class.

5. The method according to claim 2, wherein determining the classification result of the to-be-processed image from the candidate class based on the confidence comprises:
    determining a class with largest confidence in the candidate class as the classification result of the to-be-processed image.

6. The method according to claim 1, wherein the preset global class feature is obtained through training based on a classification error,
    wherein the classification error is determined based on a classification result of a training image in a query set and a pre-tagged label of the training image in the query set,
    wherein the label indicates a class to which the training image belongs, and
    wherein the query set comprises a part of training images in a part of classes in the training set.

7. The method according to claim 1, wherein the preset global class feature is obtained through training based on a classification error and a registration error,
    wherein the classification error is determined based on a classification result of a training image in a query set and a pre-tagged label of the training image in the query set,
    wherein the label indicates a class to which the training image belongs, wherein the query set comprises a part of training images in a part of classes in the training set, wherein the registration error is determined based on a local class feature of training images and the plurality of class features in the preset global class feature, wherein the local class feature of the training images comprises a plurality of class features determined based on the plurality of training images in the support set, wherein the plurality of class features in the local class feature of the training images is used to indicate visual features of all classes in the support set, and wherein the support set comprises a part of training images in a part of classes in the training set.

8. The method according to claim 7, wherein the local class feature of the training images is determined based on a plurality of training images that are obtained after expansion processing is performed on the support set, and wherein the expansion processing comprises cropping processing, flipping processing, and/or data hallucination processing on an image.

9. An image classification model training method, applied to an image classification model training apparatus comprising a processor and a memory, the method comprising:

obtaining a plurality of training images in a training set, wherein the training set comprises a support set and a query set, and wherein the plurality of training images comprises a plurality of training images in the support set and a plurality of training images in the query set;

extracting feature vectors of the plurality of training images in the query set based on a preset first neural network, wherein the query set comprises a part of images in a part of classes in the training set;

processing the feature vectors of the plurality of training images in the query set, based on a preset second neural network and a preset global class feature, to obtain classification results of the plurality of training images in the query set, wherein the preset global class feature comprises a plurality of class features, wherein the plurality of class features in the preset global class feature are used to indicate visual features of all classes in the training set, wherein all the classes in the training set are classes to which all the training images in the training set belong, and wherein the training set comprises images in a base class and images in a novel class; and updating the preset global class feature based on the classification results of the plurality of training images in the query set.

10. The method according to claim 9, wherein processing the feature vectors of the plurality of training images in the query set, based on the preset second neural network and the preset global class feature, to obtain classification results of the plurality of training images in the query set comprises:

extracting feature vectors of the plurality of training images in the support set, wherein the support set comprises a part of training images in a part of classes in the training set;

determining a local class feature of the training images based on the feature vectors of the plurality of training images in the support set, wherein a plurality of class features in the local class feature of the training images are used to indicate visual features of all classes in the support set; and determining the classification results of the plurality of training images in the query set based on the second neural network, the local class feature of the training images, and the preset global class feature.

11. The method according to claim 9, wherein updating the preset global class feature based on the classification results of the plurality of training images in the query set comprises:

updating the preset global class feature, the first neural network, and the second neural network based on the classification results of the plurality of training images in the query set.

12. The method according to claim 9, wherein updating the preset global class feature based on the classification results of the plurality of training images in the query set comprises:

updating the preset global class feature based on classification errors, wherein the classification errors are determined based on the classification results of the plurality of training images in the query set and pre-tagged labels of the plurality of training images in the query set, and wherein the label indicates a class to which the training image belongs.

13. The method according to claim 10, wherein updating the preset global class feature based on the classification results of the plurality of training images comprises:

updating the preset global class feature based on the classification errors and a registration error, wherein the registration error is determined based on the local class feature of the training images and the plurality of class features in the preset global class feature.

14. The method according to claim 13, wherein the local class feature of the training images is determined based on the plurality of training images that are obtained after expansion processing is performed on the support set, and wherein the expansion processing comprises cropping processing, flipping processing, and/or data hallucination processing on an image.

15. An image classification apparatus comprising:

a processor; and a memory coupled to the processor and having processor-executable instructions stored thereon, which are executed by the processor and the cause the processor to:

obtain a to-be-processed image; and classify the to-be-processed image, based on a preset global class feature, to obtain a classification result of the to-be-processed image, wherein the preset global class feature comprises a plurality of class features obtained through training based on a plurality of training images in a training set, wherein the plurality of class features in the preset global class feature are used to indicate visual features of all classes in the training set, wherein all the classes in the training set are classes to which all the training images in the training set belong, and wherein the training set comprises images in a base class and images in a novel class.

16. The apparatus according to claim 15, wherein the processor is further configured to:

extract a feature vector of the to-be-processed image;

determine, based on the feature vector of the to-be-processed image, confidence that the to-be-processed image belongs to a candidate class, wherein the candidate class is one or more of the plurality of classes indicated by the preset global class feature; and determine the classification result of the to-be-processed image from the candidate class based on the confidence.

17. The apparatus according to claim 16, wherein the processor is further configured to:
determine a local class feature of the to-be-processed image based on a support set of the to-be-processed image; and
determine the candidate class based on the local class feature of the to-be-processed image and the preset global class feature,
wherein the support set of the to-be-processed image comprises a plurality of images, and
wherein a class to which the plurality of images belong is one or more of the plurality of classes indicated by the preset global class feature.

18. The apparatus according to claim 16, wherein the processor is further configured to:
determine, based on the feature vector of the to-be-processed image, a distance between the feature vector of the to-be-processed image and a feature vector associated with each class in the candidate class; and
determine, based on the distance, the confidence that the to-be-processed image belongs to the candidate class.

19. The apparatus according to claim 16, wherein the processor is further configured to determine a class with largest confidence in the candidate class as the classification result of the to-be-processed image.

20. The apparatus according to claim 15, wherein the preset global class feature is obtained through training based on a classification error, wherein the classification error is determined based on a classification result of a training image in a query set and a pre-tagged label of the training image in the query set, wherein the label indicates a class to which the training image belongs, and wherein the query set comprises a part of training images in a part of classes in the training set.

21. The apparatus according to claim 15, wherein the preset global class feature is obtained through training based on a classification error and a registration error,
wherein the classification error is determined based on a classification result of a training image in a query set and a pre-tagged label of the training image in the query set,
wherein the label indicates a class to which the training image belongs,
wherein the query set comprises a part of training images in a part of classes in the training set,
wherein the registration error is determined based on a local class feature of training images and the plurality of class features in the preset global class feature,
wherein the local class feature of the training images comprises a plurality of class features determined based on the plurality of training images in the support set,
wherein the plurality of class features in the local class feature of the training images are used to indicate visual features of all classes in the support set, and
wherein the support set comprises some training images in some classes in the training set.

22. The apparatus according to claim 21, wherein the local class feature of the training images is determined based on a plurality of training images obtained after expansion processing is performed on the support set, and wherein the expansion processing comprises cropping processing, flipping processing, and/or data hallucination processing on an image.

23. An image classification model training apparatus comprising:
a processor; and
a memory coupled to the processor and having processor-executable instructions stored thereon, which are executed by the processor and cause the processor to:
obtain a plurality of training images in a training set, wherein the training set comprises a support set and a training set, and wherein the plurality of training images comprise a plurality of training images in the support set and a plurality of training images in a query set;
extract feature vectors of the plurality of training images in the query set based on a preset first neural network, wherein the query set comprises a part of images in a part of classes in the training set;
process the feature vectors of the plurality of training images in the query set, based on a preset second neural network and a preset global class feature, to obtain classification results of the plurality of training images in the query set,
wherein the preset global class feature comprises a plurality of class features,
wherein the plurality of class features in the preset global class feature are used to indicate visual features of all classes in the training set,
wherein all the classes in the training set are classes to which all the training images in the training set belong, and
wherein the training set comprises images in a base class and images in a novel class; and
update the preset global class feature based on the classification results of the plurality of training images in the query set.

24. The apparatus according to claim 23, wherein the processor is further configured to:
extract feature vectors of the plurality of training images in the support set, wherein the support set comprises a part of training images in a part of classes in the training set; and
determine local class feature of the training images based on the feature vectors of the plurality of training images in the support set, wherein a plurality of class features in the local class feature of the training images are used to indicate visual features of all classes in the support set, and wherein the support set comprises a part of training images in a part of classes in the training set; and
determine the classification results of the plurality of training images in the query set based on the second neural network, the local class feature of the training images, and the preset global class feature.

25. The apparatus according to claim 23, wherein the processor is further configured to update the preset global class feature, the first neural network, and the second neural network based on the classification results of the plurality of training images in the query set.

26. The apparatus according to claim 23, wherein the processor is further configured to update the preset global class feature based on classification errors, wherein the classification errors are determined based on the classification results of the plurality of training images in the query set and pre-tagged labels of the plurality of training images in the query set, and wherein the label indicates a class to which the training image belongs.

27. The apparatus according to claim 24, wherein the processor is further configured to update the preset global class feature based on the classification errors and a registration error, wherein the registration error is determined based on the local class feature of the training images and the plurality of class features in the preset global class feature.

28. The apparatus according to claim 27, wherein the local class feature of the training images is determined based on the plurality of training images obtained after expansion processing is performed on the support set, and the expansion processing comprises cropping processing, flipping processing, and/or data hallucination processing on an image.

29. A non-transitory computer-readable storage medium, wherein the computer-readable storage medium stores program code to be executed by a device, and the program code includes instructions for performing a method according to claim 1.

30. A chip comprising a processor and a data interface, wherein the processor uses the data interface to read instructions stored in a memory to perform the method according to claim 1.

* * * * *